United States Patent
Huang et al.

(10) Patent No.: US 11,284,246 B2
(45) Date of Patent: Mar. 22, 2022

(54) UPLINK TRANSMISSION METHOD, UPLINK TRANSMISSION CONFIGURATION METHOD, USER EQUIPMENT AND BASE STATION

(71) Applicant: CHINA ACADEMY OF TELECOMMUNICATIONS TECHNOLOGY, Beijing (CN)

(72) Inventors: Qiuping Huang, Beijing (CN); Qiubin Gao, Beijing (CN); Rakesh Tamrakar, Beijing (CN); Hui Li, Beijing (CN); Runhua Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 26 days.

(21) Appl. No.: 16/652,371

(22) PCT Filed: Sep. 25, 2018

(86) PCT No.: PCT/CN2018/107212
§ 371 (c)(1),
(2) Date: Mar. 30, 2020

(87) PCT Pub. No.: WO2019/062681
PCT Pub. Date: Apr. 4, 2019

(65) Prior Publication Data
US 2020/0275260 A1    Aug. 27, 2020

(30) Foreign Application Priority Data
Sep. 30, 2017   (CN) ......................... 201710923315.7

(51) Int. Cl.
*H04W 8/24*       (2009.01)
*H04L 5/00*       (2006.01)
(Continued)

(52) U.S. Cl.
CPC ............. *H04W 8/24* (2013.01); *H04L 5/0051* (2013.01); *H04W 72/0413* (2013.01); *H04W 88/06* (2013.01); *H04W 88/10* (2013.01)

(58) Field of Classification Search
CPC ... H04W 8/24; H04W 72/0413; H04W 88/06; H04W 88/10; H04W 72/0493;
(Continued)

(56) References Cited

U.S. PATENT DOCUMENTS

| 2012/0314678 A1 | 12/2012 | Ko et al. |
| 2013/0094604 A1 | 4/2013 | Mondal et al. |

(Continued)

FOREIGN PATENT DOCUMENTS

| CN | 101282175 A | 10/2008 |
| CN | 102859896 A | 1/2013 |

(Continued)

OTHER PUBLICATIONS

Second Office Action from CN app. No. 201710923315.7, dated Sep. 17, 2020, with English translation provided by Global Dossier.
(Continued)

*Primary Examiner* — Thai Nguyen
(74) *Attorney, Agent, or Firm* — Ladas & Parry, LLP

(57) ABSTRACT

An uplink transmission method, an uplink transmission configuration method, a UE and a base station are provided. The uplink transmission method applied for the UE includes: acquiring configuration information about one or more uplink reference signal resources configured by the base station for the UE; transmitting one or more uplink reference signals based on the configuration information about the one or more uplink reference signal resources; receiving indication information about uplink transmission determined by the base station; and performing the uplink transmission based on the indication information.

20 Claims, 3 Drawing Sheets

(51) Int. Cl.
*H04W 72/04* (2009.01)
*H04W 88/06* (2009.01)
*H04W 88/10* (2009.01)

(58) Field of Classification Search
CPC ............. H04W 72/048; H04W 72/046; H04L 5/0051; H04L 1/0025; H04L 5/0044; H04L 5/0048; H04L 5/0094; H04L 5/0007; H04L 5/0023; H04L 5/0053; H04B 7/0639; H04B 7/063; H04B 7/0456
See application file for complete search history.

(56) References Cited

U.S. PATENT DOCUMENTS

| | | | |
|---|---|---|---|
| 2014/0064213 A1* | 3/2014 | Guo | H04W 72/04 370/329 |
| 2015/0222345 A1 | 8/2015 | Chapman et al. | |
| 2016/0006487 A1 | 1/2016 | Ding et al. | |
| 2017/0324528 A1* | 11/2017 | Rico Alvarino | H04L 5/0048 |

FOREIGN PATENT DOCUMENTS

| | | |
|---|---|---|
| CN | 103051580 A | 4/2013 |
| CN | 103259582 A | 8/2013 |
| CN | 104038319 A | 9/2014 |
| CN | 104936047 A | 9/2015 |
| CN | 106452697 A | 2/2017 |
| JP | 2011040841 A | 2/2011 |
| WO | 2018231141 A | 12/2018 |

OTHER PUBLICATIONS

"Codebook based transmission for UL", R1-1716785, 3GPP TSG RAN WG1 Meeting NR#3, Nagoya, Japan, Sep. 18-21, 2017.
First Office Action and Search Report from CN app. No. 201710923315.7, dated Jan. 14, 2020, with English translation from Global Dossier.
International Search Report from PCT/CN2018/107212, dated Dec. 13, 2018, with English translation from WIPO.
Written Opinion of the International Searching Authority from from PCT/CN2018/107212, dated Dec. 13, 2018, with English translation from WIPO.
International Preliminary Report on Patentability from PCT/CN2018/107212, dated Mar. 31, 2020, with English translation from WIPO.
"Codebook based transmission for UL MIMO", R1-1710447, 3GPP TSG RAN WG1 Ad Hoc Meeting, Qingdao, China, Jun. 27-30, 2017.
"Discussion on codebook based transmission for UL", R1-1715794, 3GPP TSG RAN WG1 Meeting NR#3, Nagoya, Japan, Sep. 18-21, 2017.
Notice of Reasons for Refusal from JP app. No. 2020-517465, dated May 18, 2021, with English translation from Global Dossier.
"Remaining issues on Codebook Based UL Transmission", R1-1716285, 3GPP TSG RAN WG1 Meeting NR#3, Nagoya, Japan, Sep. 18-21, 2017.
Decision of Refusal from corresponding JP app. No. 2020-517465, dated Nov. 24, 2021, with English translation from Global Dossier, all pages.
Communication pursuant to Article 94(3) EPC from corresponding EP app. No. 18861467.1, dated Dec. 17, 2021, all pages.
Texas Instruments, "DCI Format 4 Fields for Supporting UL SU-MIMO", R1-105898, 3GPP TSG RAN WG1 63, Jacksonville, USA, Nov. 15-19, 2010, all pages.
Ericsson, "UL MIMO for codebook based transmission", R1-1716341, 3GPP TSG-RAN WG1 NR Ad Hoc #3, Nagoya, Japan, Sep. 18-21, 2017, all pages.

* cited by examiner

UPLINK TRANSMISSION METHOD, UPLINK TRANSMISSION CONFIGURATION METHOD, USER EQUIPMENT AND BASE STATION

CROSS-REFERENCE TO RELATED APPLICATIONS

The present application is the U.S. national phase of PCT Application No. PCT/CN2018/107212 filed on Sep. 25, 2018, which claims a priority to the Chinese patent application No. 201710923315.7 filed on Sep. 30, 2017, the disclosures of which are incorporated herein by reference in their entireties.

TECHNICAL FIELD

The present disclosure relates to the field of communication technology, in particular to an uplink transmission method, an uplink transmission configuration method, a User Equipment (UE) and a base station.

BACKGROUND

In Long Term Evolution (LTE) Release 8 (Rel-8), at most 4 layers of Multiple Input Multiple Output (MIMO) transmission may be supported.

Rel-9 focuses on the enhancement of a Multi-User (MU)-MIMO technology, and at most 4 downlink data layers may be supported during the MU-MIMO transmission in a Transmission Mode (TM) 8.

In Rel-10, 8 uplink reference signal ports have been introduced, so as to further increase a spatial resolution of Channel State Information (CSI). In addition, a transmission capability of Single-Use (SU)-MIMO is extended to at most 8 data layers.

In Rel-13 and Rel-14, a Frequency Division (FD)-MIMO technology has been introduced so as to support 32 ports, thereby to achieve beamforming in full dimensions and in a vertical direction.

In order to further improve the MIMO technology, a massive MIMO technique has been introduced into a mobile communication system. For a base station, the full-digital massive MIMO technique may provide up to 128/256/512 antenna elements, and up to 128/256/512 transceiver units, and each antenna element is connected to one transceiver unit. Through the transmission of a pilot signal for up to 128/256/512 uplink reference signal ports, a UE may measure the CSI and transmit a feedback message to the base station.

An antenna array consisting of up to 32/64 antenna elements may be configured for the UE. Through beamforming at both the base station and the UE, a significantly large beamforming gain may be acquired, so as to compensate for signal attenuation caused by a path loss. Especially for the communication at a high frequency, e.g., 30 GHz, a coverage range of a radio signal may be very limited due to the path loss. Through the massive MIMO technique, it is able to enlarge the coverage range of the radio signal to an applicable range.

In a communication system in a related art, codebook-based uplink transmission may be commonly used.

For a codebook-based uplink transmission scheme, an uplink reference signal e.g., a Sounding Reference Signal (SRS) may be transmitted by the UE to the base station (BS).

The base station may measure the uplink reference signal, determines such information as a Transmission Precoding Matrix Indicator (TPMI), a Transmission Rank Indicator (TRI) and a Modulation and Coding Scheme (MCS) to be used by the UE, perform an uplink scheduling operation, and transmit information related to the uplink scheduling operation, e.g., the TRI, the TRMI and MCS, to the UE through Downlink Control Information (DCI).

The UE may determine precoding/beamforming to be used for the transmission of uplink data (or signal) based on the TRI and TPMI from the base station, and perform the data transmission using the precoding/beamforming.

The determination, by the base station, of the TPMI and the TRI to be used by the UE, and the determination, by the UE, of the precoding/beamforming for the data transmission based on the TPMI and the TRI, may be both performed on the basis of the codebook.

In an actual system, due to the constraint of hardware implementation, although a plurality of transmission chains is supported, it is impossible to perform phase calibration between different transmission chains, so some UEs are incapable of performing coherent transmission on all transmission chains, i.e., it is impossible to transmit multiple layers of signals on the transmission chains simultaneously.

When the base station performs the uplink scheduling operation based on the hypothesis that the UE is capable of performing the coherent transmission on all the transmission chains, performance estimated during the scheduling may be inconsistent with actual transmission performance, so the uplink transmission performance may be deteriorated.

Hence, the UE needs to report its coherent transmission capability on the transmission chain, so as to provide a same hypothesis on the transmission chain for both the base station and the UE, thereby to ensure the uplink transmission performance.

In a communication system in the related art, there is no interaction information about the coherent transmission capability on the transmission chain between the UE and the base station, nor uplink scheduling scheme or uplink access grant scheme for the base station on the basis of the coherent transmission capability of the UE on the transmission chain.

SUMMARY

An object of the present disclosure is to provide an uplink transmission method, an uplink transmission configuration method, a UE and a base station, so as to provide a transmission and reception scheme for interaction information about the coherent transmission capability on the transmission chain between the UE and the base station as well as an interaction scheme for such signaling as resource configuration and uplink access grant, thereby to ensure the uplink transmission performance of the UE.

In one aspect, the present disclosure provides in some embodiments an uplink transmission method, including: acquiring configuration information about one or more uplink reference signal resources configured by a base station for a UE; transmitting one or more uplink reference signals based on the configuration information about the one or more uplink reference signal resources; receiving indication information about uplink transmission determined by the base station; and performing the uplink transmission based on the indication information.

In a possible embodiment of the present disclosure, prior to transmitting the one or more uplink reference signals based on the configuration information about the one or more uplink reference signal resources, the uplink transmission method further includes transmitting coherent transmission capability information about the UE to the base station.

In a possible embodiment of the present disclosure, the acquiring the configuration information about the one or more uplink reference signal resources configured by the base station for the UE includes receiving the configuration information about the one or more uplink reference signal resources determined by the base station based on the coherent transmission capability information about the UE.

In a possible embodiment of the present disclosure, prior to transmitting the one or more uplink reference signals based on the configuration information about the one or more uplink reference signal resources, the uplink transmission method further includes receiving information about a coherent transmission relationship among uplink reference signal ports in the one or more uplink reference signal resources from the base station.

In a possible embodiment of the present disclosure, the transmitting the one or more uplink reference signals based on the configuration information about the one or more uplink reference signal resources includes determining a transmission antenna corresponding to each uplink reference signal port included in the configuration information about the one or more uplink reference signal resources based on the configuration information about the one or more uplink reference signal resources and the information about the coherent transmission relationship, and transmitting the one or more uplink reference signals through the transmission antenna.

In a possible embodiment of the present disclosure, the information about the coherent transmission relationship is information about the coherent transmission relationship among the uplink reference signal ports in each uplink reference signal resource.

In a possible embodiment of the present disclosure, the information about the coherent transmission relationship is included in the configuration information about the one or more uplink reference signal resource, or the coherent transmission relationship information is information indicated separately.

In a possible embodiment of the present disclosure, the information about the coherent transmission relationship is determined based on the coherent transmission capability information.

In a possible embodiment of the present disclosure, the indication information about the uplink transmission and contents indicated by the indication information are determined based on the coherent transmission relationship and the one or more uplink reference signals received by the base station.

In a possible embodiment of the present disclosure, the coherent transmission capability information about the UE is a coherent transmission capability of antennas supported by the UE.

In a possible embodiment of the present disclosure, the antennas include physical antennas, transmission chains, transmission and reception units (TXRUs) or uplink reference signal ports.

In a possible embodiment of the present disclosure, a mapping between the coherent transmission relationship among the uplink reference signal ports in the one or more uplink reference signal resources configured by the base station for the UE and the coherent transmission capability of the UE is predefined.

In a possible embodiment of the present disclosure, the coherent transmission capability information about the UE includes antenna group information, antennas in each antenna group are capable of being used for coherent transmission, and antennas in different antenna groups are incapable of being used for coherent transmission.

In a possible embodiment of the present disclosure, the antenna group information includes information about the quantity of antenna groups and information about the quantity of antennas in each antenna group.

In a possible embodiment of the present disclosure, the coherent transmission capability information about the UE further includes information about the total quantity of antennas.

In a possible embodiment of the present disclosure, the coherent transmission capability information about the UE includes information indicating that at least parts of the antennas are capable of being used for the coherent transmission or information indicating that all the antennas are incapable of being used for the coherent transmission.

In a possible embodiment of the present disclosure, the coherent transmission capability information about the UE includes information about the maximum quantity of antennas capable of being used for the coherent transmission or the minimum quantity of antennas capable of being used for the coherent transmission.

In a possible embodiment of the present disclosure, the information about the coherent transmission relationship includes uplink reference signal port group information, uplink reference signal ports in each uplink reference signal port group are capable of being used for the coherent transmission, and uplink reference signal ports in different uplink reference signal port groups are incapable of being used for the coherent transmission.

In a possible embodiment of the present disclosure, the information about the coherent transmission relationship includes information about the maximum quantity of uplink reference signal ports capable of being used for the coherent transmission or the minimum quantity of uplink reference signal ports capable of being used for the coherent transmission.

In a possible embodiment of the present disclosure, the information about the coherent transmission relationship includes information indicating that at least parts of the uplink reference signal ports in a same uplink reference signal resource are capable of being used for the coherent transmission or information indicating that all the uplink reference signal ports in the same uplink reference signal resource are incapable of being used for the coherent transmission.

In a possible embodiment of the present disclosure, the uplink reference signal port group information in the information about the coherent transmission relationship includes: 1) information indicating that merely parts of the uplink reference signal ports in at least one uplink reference signal resource are capable of being used for the coherent transmission when the configuration information about the one or more uplink reference signal resources includes one or more uplink reference signal resources; or 2) information indicating that all the uplink reference signal ports in each uplink reference signal resource are capable of being used for the coherent transmission and the uplink reference signal ports in different uplink reference signal resources are incapable of being used for the coherent transmission when the configuration information about the one or more uplink reference signal resources includes a plurality of uplink reference signal resources; or 3) information indicating that the uplink reference signal ports in each uplink reference signal resource are capable of being used for the coherent transmission and the uplink reference signal ports in parts of the uplink reference signal resources are capable of being used for the coherent transmission when the configuration information about the one or more uplink reference signal resources includes a plurality of uplink reference signal resources; or 4) information indicating that parts of the uplink reference signal ports in one uplink reference signal resource and parts of the uplink reference signal ports in another uplink reference signal resource are capable of being used for the coherent transmission when the configuration information about the one or more uplink reference signal resources includes a plurality of uplink reference signal resources; or 5) information indicating that any two uplink reference signal resources in a same resource group are incapable of being used for the transmission of the one or more uplink reference signals simultaneously and any two uplink reference signal resources in the same resource group has the same coherent transmission relationship among the uplink reference signal ports in the uplink reference signal resource when the configuration information about the one or more uplink reference signal resources includes a plurality of uplink reference signal resources which is divided into a plurality of resource groups and all the uplink reference signal resources in a same resource group have the same quantity of uplink reference signal ports; or 6) information indicating that any two resource groups include the same quantity of uplink reference signal resources, the same coherent transmission relationship among the uplink reference signal ports in the resource group and the uplink reference signal resources are incapable of being used for the transmission of the one or more uplink reference signals simultaneously when the configuration information about the one or more uplink reference signal resources includes a plurality of uplink reference signal resources which is divided into a plurality of resource groups.

In a possible embodiment of the present disclosure, the configuration information includes the quantity of the uplink reference signal resources and the quantity of the uplink reference signal ports in each uplink reference signal resource.

In a possible embodiment of the present disclosure, the information about the coherent transmission relationship includes: 1) a coherent transmission relationship among the uplink reference signal ports in one uplink reference signal resource and applied to all the uplink reference signal resources when the configuration information about the one or more uplink reference signal resources includes a plurality of uplink reference signal resources; 2) a coherent transmission relationship among the uplink reference signal ports in one uplink reference signal resource and applied to all the uplink reference signal resources in an uplink reference signal resource group to which the uplink reference signal resource belongs when the configuration information about the one or more uplink reference signal resources includes a plurality of uplink reference signal resource groups each including one or more uplink reference signal resources; or 3) a coherent transmission relationship among the uplink reference signal ports in one uplink reference signal resource groups and applied to all the uplink reference signal resource groups when the configuration information about the one or more uplink reference signal resources includes a plurality of uplink reference signal resource groups.

In a possible embodiment of the present disclosure, the information about the coherent transmission relationship is a mapping between the uplink reference signal ports and the antenna groups, or a mapping between the uplink reference signal resources and the antenna groups.

In a possible embodiment of the present disclosure, prior to transmitting the one or more uplink reference signals based on the configuration information about the one or more uplink reference signal resources, the uplink transmission method further includes determining the coherent transmission relationship among the uplink reference signal ports in each uplink reference signal resource configured by the base station for the UE based on the coherent transmission capability of the UE and the configuration information about the one or more uplink reference signal resources, and a mapping between the coherent transmission relationship and the coherent transmission capability of the UE is predefined. The transmitting the one or more uplink reference signals based on the configuration information about the one or more uplink reference signal resources includes determining antennas for the transmission of the one or more uplink reference signals based on the coherent transmission relationship, and the one or more uplink reference signals are transmitted on the uplink reference signal ports capable of being used for the coherent transmission through the antennas capable of being used for the coherent transmission.

In a possible embodiment of the present disclosure, the receiving the indication information about the uplink transmission determined by the base station and performing the uplink transmission includes: receiving the indication information about the uplink transmission, the indication information including an SRS Resource Indicator (SRI), or a TPMI and a TRI, or the TPMI, the TRI and the SRI; and determining a precoding matrix, the quantity of transmission layers and the antennas to be used for the uplink transmission based on the indication information.

In a possible embodiment of the present disclosure, prior to receiving the indication information about the uplink transmission determined by the base station, the uplink transmission method further includes transmitting, to the base station, the information about the coherent transmission relationship among the uplink reference signal ports in the one or more uplink reference signal resources configured by the base station for the UE.

In a possible embodiment of the present disclosure, the information about the coherent transmission relationship includes uplink reference signal port group information, the uplink reference signal ports in each uplink reference signal port group are capable of being used for the coherent transmission, and the uplink reference signal ports in different uplink reference signal port groups are incapable of being used for the coherent transmission.

In a possible embodiment of the present disclosure, the information about the coherent transmission relationship includes information about the maximum quantity of uplink reference signal ports capable of being used for the coherent transmission or the minimum quantity of uplink reference signal ports capable of being used for the coherent transmission.

In a possible embodiment of the present disclosure, the information about the coherent transmission relationship includes information indicating that at least parts of the uplink reference signal ports in a same uplink reference signal resource are capable of being used for the coherent transmission or information indicating that all the uplink reference signal ports are incapable of being used for the coherent transmission.

In a possible embodiment of the present disclosure, the transmitting the one or more uplink reference signals further includes determining transmission antennas for the transmission of each uplink reference signal based on the coherent transmission relationship, and each uplink reference signal is transmitted on the uplink reference signal ports capable of being used for the coherent transmission through the transmission antennas capable of being used for the coherent transmission.

In a possible embodiment of the present disclosure, the receiving the indication information about the uplink transmission determined by the base station and performing the uplink transmission includes: receiving the indication information about the uplink transmission, the indication information including an SRI, or a TPMI and a TRI, or the TPMI, the TRI and the SRI; and determining a precoding matrix, the quantity of transmission layers and the antennas to be used for the uplink transmission based on the indication information.

In a possible embodiment of the present disclosure, the receiving the indication information about the uplink transmission determined by the base station and performing the uplink transmission includes determining the precoding matrix, the quantity of transmission layers and the antennas to be used for the uplink transmission based on the indication information and the coherent transmission relationship.

In another aspect, the present disclosure provides an uplink transmission configuration method, including: configuring configuration information about one or more uplink reference signal resources for a UE; receiving one or more uplink reference signals transmitted by the UE based on the configured configuration information; and transmitting indication information about the uplink transmission to the UE.

In a possible embodiment of the present disclosure, prior to receiving the one or more uplink reference signals transmitted by the UE based on the configured configuration information, the uplink transmission configuration method includes receiving coherent transmission capability information about the UE from the UE.

In a possible embodiment of the present disclosure, the configuring the configuration information about the one or more uplink reference signal resources for the UE includes determining the configuration information about the one or more uplink reference signal resources based on the coherent transmission capability information reported by the UE.

In a possible embodiment of the present disclosure, prior to receiving the one or more uplink reference signals transmitted by the UE based on the configured configuration information, the uplink transmission configuration method further includes transmitting information about a coherent transmission relationship among the uplink reference signal ports in the one or more uplink reference signal resources to the UE.

In a possible embodiment of the present disclosure, the information about the coherent transmission relationship is information about the coherent transmission relationship among the uplink reference signal ports in each uplink reference signal resource.

In a possible embodiment of the present disclosure, the information about the coherent transmission relationship is included in the configuration information about the one or more uplink reference signal resource, or the coherent transmission relationship information is information indicated separately.

In a possible embodiment of the present disclosure, the information about the coherent transmission relationship is determined based on the coherent transmission capability information.

In a possible embodiment of the present disclosure, the indication information about the uplink transmission and contents indicated by the indication information are determined based on the coherent transmission relationship and the one or more uplink reference signals received by the base station.

In a possible embodiment of the present disclosure, the coherent transmission capability information about the UE is a coherent transmission capability of antennas supported by the UE.

In a possible embodiment of the present disclosure, the antennas include physical antennas, transmission chains, TXRUs or uplink reference signal ports.

In a possible embodiment of the present disclosure, the coherent transmission capability information about the UE includes antenna group information, antennas in each antenna group are capable of being used for coherent transmission, and antennas in different antenna groups are incapable of being used for coherent transmission.

In a possible embodiment of the present disclosure, the coherent transmission capability information about the UE further includes information about the total quantity of antennas.

In a possible embodiment of the present disclosure, the information about the coherent transmission relationship includes uplink reference signal port group information, uplink reference signal ports in each uplink reference signal port group are capable of being used for the coherent transmission, and uplink reference signal ports in different uplink reference signal port groups are incapable of being used for the coherent transmission.

In a possible embodiment of the present disclosure, the information about the coherent transmission relationship includes information about the maximum quantity of uplink reference signal ports capable of being used for the coherent transmission or the minimum quantity of uplink reference signal ports capable of being used for the coherent transmission.

In a possible embodiment of the present disclosure, the information about the coherent transmission relationship includes information indicating that at least parts of the uplink reference signal ports in a same uplink reference signal resource are capable of being used for the coherent transmission or information indicating that all the uplink reference signal ports in the same uplink reference signal resource are incapable of being used for the coherent transmission.

In a possible embodiment of the present disclosure, the uplink reference signal port group information in the information about the coherent transmission relationship includes: 1) information indicating that merely parts of the uplink reference signal ports in at least one uplink reference signal resource are capable of being used for the coherent transmission when the configuration information about the one or more uplink reference signal resources includes one or more uplink reference signal resources; or 2) information indicating that all the uplink reference signal ports in each uplink reference signal resource are capable of being used for the coherent transmission and the uplink reference signal ports in different uplink reference signal resources are incapable of being used for the coherent transmission when the configuration information about the one or more uplink reference signal resources includes a plurality of uplink reference signal resources; or 3) information indicating that the uplink reference signal ports in each uplink reference signal resource are capable of being used for the coherent transmission and the uplink reference signal ports in parts of the uplink reference signal resources are capable of being used for the coherent transmission when the configuration information about the one or more uplink reference signal resources includes a plurality of uplink reference signal resources; or 4) information indicating that parts of the uplink reference signal ports in one uplink reference signal resource and parts of the uplink reference signal ports in another uplink reference signal resource are capable of being used for the coherent transmission when the configuration information about the one or more uplink reference signal resources includes a plurality of uplink reference signal resources; or 5) information indicating that any two uplink reference signal resources in a same resource group are incapable of being used for the transmission of the one or more uplink reference signals simultaneously and any two uplink reference signal resources in the same resource group has the same coherent transmission relationship among the uplink reference signal ports in the uplink reference signal resource when the configuration information about the one or more uplink reference signal resources includes a plurality of uplink reference signal resources which is divided into a plurality of resource groups and all the uplink reference signal resources in a same resource group have the same quantity of uplink reference signal ports; or 6) information indicating that any two resource groups include the same quantity of uplink reference signal resources, the same coherent transmission relationship among the uplink reference signal ports in the resource group and the uplink reference signal resources are incapable of being used for the transmission of the one or more uplink reference signals simultaneously when the configuration information about the one or more uplink reference signal resources includes a plurality of uplink reference signal resources which is divided into a plurality of resource groups.

In a possible embodiment of the present disclosure, the configuration information includes the quantity of the uplink reference signal resources and the quantity of the uplink reference signal ports in each uplink reference signal resource.

In a possible embodiment of the present disclosure, the information about the coherent transmission relationship includes: 1) a coherent transmission relationship among the uplink reference signal ports in one uplink reference signal resource and applied to all the uplink reference signal resources when the configuration information about the one or more uplink reference signal resources includes a plurality of uplink reference signal resources; 2) a coherent transmission relationship among the uplink reference signal ports in one uplink reference signal resource and applied to all the uplink reference signal resources in an uplink reference signal resource group to which the uplink reference signal resource belongs when the configuration information about the one or more uplink reference signal resources includes a plurality of uplink reference signal resource groups each including one or more uplink reference signal resources; or 3) a coherent transmission relationship among the uplink reference signal ports in one uplink reference signal resource groups and applied to all the uplink reference signal resource groups when the configuration information about the one or more uplink reference signal resources includes a plurality of uplink reference signal resource groups.

In a possible embodiment of the present disclosure, the information about the coherent transmission relationship is a mapping between the uplink reference signal ports and the antenna groups, or a mapping between the uplink reference signal resources and the antenna groups.

In a possible embodiment of the present disclosure, prior to receiving the one or more uplink reference signals transmitted by the UE based on the configured configuration information, the uplink transmission configuration method further includes determining a coherent transmission relationship among the uplink reference signal ports in the one or more uplink reference signal resources configured for the UE based on the coherent transmission capability of the UE and the configuration information about the one or more uplink reference signal resources, and a mapping between the coherent transmission relationship and the coherent transmission capability of the UE is predefined. The transmitting the one or more uplink reference signals based on the configuration information about the one or more uplink reference signal resources includes determining antennas for the transmission of the one or more uplink reference signals based on the coherent transmission relationship, and the one or more uplink reference signals are transmitted on the uplink reference signal ports capable of being used for the coherent transmission through the antennas capable of being used for the coherent transmission.

In a possible embodiment of the present disclosure, the configuring the configuration information about the one or more uplink reference signal resources for the UE includes directly transmitting the configuration information about the one or more uplink reference signal resources to the UE.

In a possible embodiment of the present disclosure, prior to receiving the one or more uplink reference signals transmitted by the UE based on the configured configuration information, the uplink transmission configuration method further includes receiving the information about the coherent transmission relationship among the uplink reference signal ports from the UE.

In a possible embodiment of the present disclosure, the information about the coherent transmission relationship includes uplink reference signal port group information, the uplink reference signal ports in each uplink reference signal port group are capable of being used for the coherent transmission, and the uplink reference signal ports in different uplink reference signal port groups are incapable of being used for the coherent transmission.

In a possible embodiment of the present disclosure, the transmitting the indication information about the uplink transmission to the UE includes transmitting the indication information about the uplink transmission including an SRI, or a TPMI and a TRI, or the TPMI, the TRI and the SRI to the UE.

In a possible embodiment of the present disclosure, the indication information about the uplink transmission is determined based on the coherent transmission relationship.

In yet another aspect, the present disclosure provides in some embodiments a UE, including: an acquisition module configured to acquire configuration information about one or more uplink reference signal resources configured by a base station for the UE; a transmission module configured to transmit one or more uplink reference signals based on the configuration information about the one or more uplink reference signal resources; and a reception module configured to receive indication information about uplink transmission determined by the base station. The transmission module is further configured to perform the uplink transmission based on the indication information.

In a possible embodiment of the present disclosure, the transmission module is further configured to transmit coherent transmission capability information about the UE to the base station.

In a possible embodiment of the present disclosure, the reception module is further configured to receive the configuration information about the one or more uplink reference signal resources determined by the base station based on the coherent transmission capability information about the UE.

In a possible embodiment of the present disclosure, the reception module is further configured to receive information about a coherent transmission relationship among uplink reference signal ports in the one or more uplink reference signal resources from the base station.

In a possible embodiment of the present disclosure, the transmission module is further configured to determine a transmission antenna corresponding to each uplink reference signal port included in the configuration information about the one or more uplink reference signal resources based on the configuration information about the one or more uplink reference signal resources and the information about the coherent transmission relationship, and transmit the one or more uplink reference signals through the transmission antenna.

In a possible embodiment of the present disclosure, a mapping between the coherent transmission relationship among the uplink reference signal ports in the one or more uplink reference signal resources configured by the base station for the UE and the coherent transmission capability of the UE is predefined.

In a possible embodiment of the present disclosure, the transmission module is further configured to determine the coherent transmission relationship among the uplink reference signal ports in each uplink reference signal resource configured by the base station for the UE based on the coherent transmission capability of the UE and the configuration information about the one or more uplink reference signal resources, and a mapping between the coherent transmission relationship and the coherent transmission capability of the UE is predefined. The transmission module is further configured to determine antennas for the transmission of the one or more uplink reference signals based on the coherent transmission relationship, and the one or more uplink reference signals are transmitted on the uplink reference signal ports capable of being used for the coherent transmission through the antennas capable of being used for the coherent transmission.

In a possible embodiment of the present disclosure, the transmission module is further configured to transmit, to the base station, the information about the coherent transmission relationship among the uplink reference signal ports in the one or more uplink reference signal resources configured by the base station for the UE.

In a possible embodiment of the present disclosure, the transmission module is further configured to determine transmission antennas for the transmission of each uplink reference signal based on the coherent transmission relationship, and each uplink reference signal is transmitted on the uplink reference signal ports capable of being used for the coherent transmission through the transmission antennas capable of being used for the coherent transmission.

In a possible embodiment of the present disclosure, the reception module is further configured to: determine a precoding matrix, the quantity of transmission layers and the antennas to be used for the uplink transmission based on the indication information; or determine the precoding matrix, the quantity of transmission layers and the antennas to be used for the uplink transmission based on the indication information and the coherent transmission relationship. The indication information about the uplink transmission includes an SRI, or a TPMI and a TRI, or the TPMI, the TRI and the SRI.

In still yet another aspect, the present disclosure provides in some embodiments a UE, including a transceiver, a memory, a processor, and a computer program stored in the memory and executed by the processor. The processor is configured to read the computer program in the memory, so as to control the transceiver to: acquire configuration information about one or more uplink reference signal resources configured by a base station for the UE; transmit one or more uplink reference signals based on the configuration information about the one or more uplink reference signal resources; receive indication information about uplink transmission determined by the base station; and perform the uplink transmission based on the indication information.

In still yet another aspect, the present disclosure provides in some embodiments a base station, including: a configuration module configured to configure configuration information about one or more uplink reference signal resources for a UE; a reception module configured to receive one or more uplink reference signals transmitted by the UE based on the configured configuration information; and a transmission module configured to transmit indication information about the uplink transmission to the UE.

In a possible embodiment of the present disclosure, the reception module is further configured to receive coherent transmission capability information about the UE from the UE.

In a possible embodiment of the present disclosure, the configuration module is further configured to determine the configuration information about the one or more uplink reference signal resources based on the coherent transmission capability information reported by the UE.

In a possible embodiment of the present disclosure, the transmission module is further configured to transmit information about a coherent transmission relationship among the uplink reference signal ports in the one or more uplink reference signal resources to the UE.

In a possible embodiment of the present disclosure, a mapping between the coherent transmission relationship and the coherent transmission capability of the UE is predefined.

In a possible embodiment of the present disclosure, the transmission module is further configured to directly transmit the configuration information about the one or more uplink reference signal resources to the UE.

In a possible embodiment of the present disclosure, the reception module is further configured to receive the information about the coherent transmission relationship among the uplink reference signal ports from the UE.

In a possible embodiment of the present disclosure, the transmission module is further configured to transmit the indication information about the uplink transmission determined based on the one or more uplink reference signals to the UE, and the indication information about the uplink transmission includes an SRI, or a TPMI and a TRI, or the TPMI, the TRI and the SRI.

In a possible embodiment of the present disclosure, the transmission module is further configured to determine the indication information about the uplink transmission based on the coherent transmission relationship.

In still yet another aspect, the present disclosure provides in some embodiments a base station, including a transceiver, a memory, a processor, and a computer program stored in the memory and executed by the processor. The processor is configured to read the computer program stored in the memory, so as to control the transceiver to: configure configuration information about one or more uplink reference signal resources for a UE; receive one or more uplink reference signals transmitted by the UE based on the configured configuration information; and transmit indication information about the uplink transmission to the UE.

In still yet another aspect, the present disclosure provides in some embodiments a computer-readable storage medium storing therein a computer program. The computer program is executed by a processor so as to implement the above-mentioned methods.

The embodiments of the present disclosure at least have the following beneficial effect. The configuration information about the one or more uplink reference signal resources configured by the base station for the UE may be acquired, the one or more uplink reference signals may be transmitted based on the configuration information about the one or more uplink reference signal resources, the indication information about the uplink transmission may be received, and then the uplink transmission may be performed based on the indication information. As a result, it is able to perform the interaction about the coherent transmission relationship among the uplink reference signal ports, thereby to ensure the uplink transmission performance of the UE.

DETAILED DESCRIPTION

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

In the embodiments of the present disclosure, the term "uplink reference signal" refers to an uplink reference signal having functions of uplink channel quality measurement and/or beam measurement and/or time-frequency measurement, and in a possible embodiment of the present disclosure, it may be a sounding reference signal (SRS).

Figure 1:
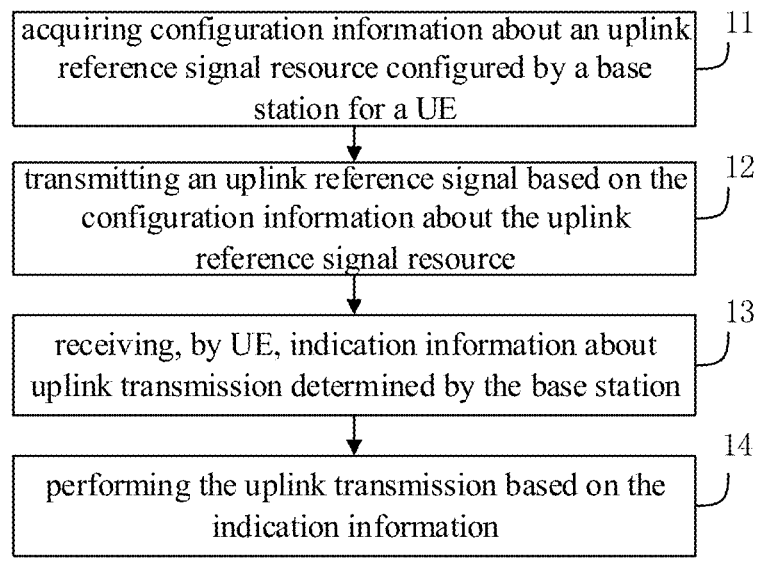
FIG. 1 is a flow chart of an uplink transmission method applied for a UE according to one embodiment of the present disclosure.

The present disclosure provides in some embodiments an uplink transmission method which, as shown in FIG. 1, includes: Step 11 of acquiring configuration information about one or more uplink reference signal resources configured by a base station for a UE; Step 12 of transmitting one or more uplink reference signals based on the configuration information about the one or more uplink reference signal resources; Step 13 of receiving indication information about uplink transmission determined by the base station; and Step 14 of performing the uplink transmission based on the indication information.

To be specific, in a first implementation mode, the uplink transmission method may include the following steps.

Step 21: transmitting coherent transmission capability information about the UE to the base station. The coherent transmission capability information about the UE may be a coherent transmission capability of antennas supported by the UE. The antennas may include physical antennas, transmission chains, TXRUs or uplink reference signal ports. Step 21 of transmitting coherent transmission capability information about the UE to the base station may be implemented before or after Step 11 of acquiring configuration information about one or more uplink reference signal resources configured by a base station for a UE.

Step 22: receiving the configuration information about the one or more uplink reference signal resources determined by the base station.

In a possible embodiment of the present disclosure, the base station may determine a configuration of the one or more uplink reference signal resources and the configuration information about the one or more uplink reference signal resources based on the coherent transmission capability information from the UE.

Prior to transmitting the one or more uplink reference signals based on the configuration information about the one or more uplink reference signal resources, the uplink transmission method may further include Step 20 of receiving information about a coherent transmission relationship among uplink reference signal ports in the one or more uplink reference signal resources from the base station.

The information about the coherent transmission relationship may be information about the coherent transmission relationship among the uplink reference signal ports in each uplink reference signal resource. The information about the coherent transmission relationship may be included in the configuration information about the one or more uplink reference signal resource, or the coherent transmission relationship information may be information indicated separately. The information about the coherent transmission relationship may be determined based on the coherent transmission capability information. Of course, the information about the coherent transmission relationship may not be determined based on the coherent transmission capability information, e.g., even when the coherent transmission capability information indicates that all the antennas for the UE are capable of being used for the coherent transmission, the information about the coherent transmission relationship transmitted by the base station may also indicate that all the uplink reference signal ports are not used for the coherent transmission.

Step 23: determining a transmission antenna corresponding to each uplink reference signal port included in the configuration information about the one or more uplink reference signal resources based on the configuration information about the one or more uplink reference signal resources and the information about the coherent transmission relationship, and transmitting the one or more uplink reference signals through the transmission antenna.

Step 24: receiving, by the terminal, the indication information about the uplink transmission determined by the base station based on the coherent transmission relationship and the one or more uplink reference signals received by the base station.

The information about the coherent transmission relationship may be information about the coherent transmission relationship among the uplink reference signal ports in each uplink reference signal resource. The information about the coherent transmission relationship may be included in the configuration information about the one or more uplink reference signal resource, or the coherent transmission relationship information may be information indicated separately.

In a possible embodiment of the present disclosure, the information about the coherent transmission relationship may be determined based on the coherent transmission capability information.

In a possible embodiment of the present disclosure, the indication information about the uplink transmission and contents indicated by the indication information may be determined based on the coherent transmission relationship and the one or more uplink reference signals received by the base station.

In a possible embodiment of the present disclosure, the information about the coherent transmission relationship may include uplink reference signal port group information, uplink reference signal ports in each uplink reference signal port group may be capable of being used for the coherent transmission, and uplink reference signal ports in different uplink reference signal port groups may be incapable of being used for the coherent transmission.

In a possible embodiment of the present disclosure, the information about the coherent transmission relationship may include information about the maximum quantity of uplink reference signal ports capable of being used for the coherent transmission or the minimum quantity of uplink reference signal ports capable of being used for the coherent transmission.

In a possible embodiment of the present disclosure, the information about the coherent transmission relationship may include information indicating that at least parts of the uplink reference signal ports in a same uplink reference signal resource are capable of being used for the coherent transmission or information indicating that all the uplink reference signal ports in the same uplink reference signal resource are incapable of being used for the coherent transmission.

Figure 2:
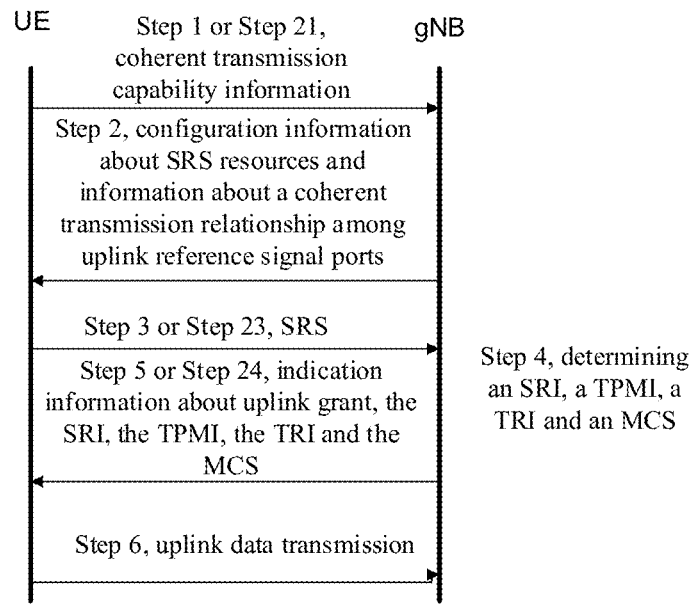
FIG. 2 is a schematic view showing an interaction procedure when a first implementation mode for the uplink transmission method in FIG. 1 is adopted.

To be specific, as shown in FIG. 2, the uplink transmission method may include the following steps.

Step 1: reporting, by the UE, the coherent transmission capability.

Step 2: determining, by the base station, the configuration information about the one or more uplink reference signal resources, and transmitting the configuration information to the UE.

In a possible embodiment of the present disclosure, the base station may determine the configuration information about the one or more uplink reference signal resources based on the coherent transmission capability of the UE.

In a possible embodiment of the present disclosure, the configuration information about the one or more uplink reference signal resources transmitted by the base station to the UE may include the information about the coherent transmission relationship among the uplink reference signal ports in each uplink reference signal resource.

Step 3: transmitting, by the UE, the one or more uplink reference signals based on the one or more uplink reference signal resources configured by the base station.

Step 4: receiving, by the base station, the one or more uplink reference signals from the UE, and determining at least one of an SRI, a TPMI and a TRI.

Step 5: transmitting, by the base station, the at least one of the SRI, the TPMI and the TRI for the uplink transmission to the UE.

Step 6: determining, by the UE, a precoding matrix, the quantity of data streams and the antennas to be used for the uplink transmission.

In some embodiments of the present disclosure, Step 3 may be performed after Step 2. When the configuration information about the one or more uplink reference signal resources is determined by the base station based on the coherent transmission capability of the UE, the step of reporting, by the UE, the coherent transmission capability needs to be performed prior to the step of determining, by the base station, the configuration information about the one or more uplink reference signal resources. Otherwise, the step of reporting, by the UE, the coherent transmission capability may be performed prior to, or subsequent to, the step of determining and transmitting, by the base station, the configuration information about the one or more uplink reference signal resources.

In some embodiments of the present disclosure, the coherent transmission capability information reported by the UE may at least include antenna group information, the antennas in each antenna group may be capable of being used for the coherent transmission, and the antennas in different antenna groups may be incapable of being used for the coherent transmission.

In a possible embodiment of the present disclosure, the antenna group information may include information about the quantity of antenna groups and information about the quantity of antennas in each antenna group.

In a possible embodiment of the present disclosure, the coherent transmission capability information about the UE may further include information about the total quantity of antennas.

In a possible embodiment of the present disclosure, the coherent transmission capability information about the UE may include information indicating that at least parts of the antennas are capable of being used for the coherent transmission or information indicating that all the antennas are incapable of being used for the coherent transmission.

In a possible embodiment of the present disclosure, the coherent transmission capability information about the UE may include information about the maximum quantity of antennas capable of being used for the coherent transmission or the minimum quantity of antennas capable of being used for the coherent transmission.

In a possible embodiment of the present disclosure, the information about the coherent transmission relationship may include uplink reference signal port group information, uplink reference signal ports in each uplink reference signal port group may be capable of being used for the coherent transmission, and uplink reference signal ports in different uplink reference signal port groups may be incapable of being used for the coherent transmission.

In a possible embodiment of the present disclosure, the information about the coherent transmission relationship may include information about the maximum quantity of uplink reference signal ports capable of being used for the coherent transmission or the minimum quantity of uplink reference signal ports capable of being used for the coherent transmission.

In a possible embodiment of the present disclosure, the information about the coherent transmission relationship may include information indicating that at least parts of the uplink reference signal ports in a same uplink reference signal resource are capable of being used for the coherent transmission or information indicating that all the uplink reference signal ports in the same uplink reference signal resource are incapable of being used for the coherent transmission.

To be specific, the coherent transmission capability information about the UE may include one or more of: information about the quantity of antennas supported by the UE; information indicating that all the antennas for the UE are capable of being used for the coherent transmission; information indicating that all the antennas for the UE are incapable of being used for the coherent transmission; information about the quantity of antenna groups for the UE capable of the being used for the coherent transmission; information about the quantity of antenna in each antenna group for the UE capable of the being used for the coherent transmission; information about the maximum quantity of antennas supported by the UE and capable of being used for the coherent transmission (e.g. at most one antenna is supported by the UE for the coherent transmission, i.e., no coherent transmission between the antennas is supported), or at least most two or four antennas are supported); information about the quantity of antenna groups each including a certain quantity of antennas supported by the UE (the certain quantity is a value agreed by the UE and the base station, or a value determined based on a rule agreed by the UE and the base station, as shown in the following tables:

| The quantity of antennas | The quantity of antenna groups |
|---|---|
| 1 | $N_1$ |
| 2 | $N_2$ |
| 4 | $N_3$ |

| The quantity of antennas | The quantity of antenna groups |
|---|---|
| 2 | $N_1$ |
| 4 | $N_2$ |
| 8 | $N_3$ | information about the quantity of antenna panels supported by the UE; information about the quantity of antennas in each antenna panel supported by the UE; information about a mapping between the antenna panels supported by the UE and the antenna groups for the coherent transmission; information about the quantity of antennas in one or more antenna panels supported by the UE; information indicating whether the antennas in one or more antenna panel supported by the UE are capable of being used for the coherent transmission; information about the quantity of antenna groups in one or more antenna panels supported by the UE and capable of being used for the coherent transmission; information about the quantity of antennas in each antenna group in one or more antenna panels supported by the UE and capable of being used for the coherent transmission; information about the maximum quantity of antennas in one or more antenna panels supported by the UE and capable of being used for the coherent transmission; and information about the quantity of antenna groups in one or more antenna panels supported by the UE and each including a certain quantity of antennas.

In a possible embodiment of the embodiment of the present disclosure, when no inter-antenna coherent transmission capability is reported by the UE, all the antennas for the UE may not be used for the coherent transmission by default.

In a possible embodiment of the present disclosure, when no inter-antenna coherent transmission capability is reported by the UE, all the antennas for the UE may be used for the coherent transmission by default.

In a possible embodiment of the present disclosure, apart from the above information, the UE may further report information about the maximum quantity of data streams supported by the UE.

In a possible embodiment of the present disclosure, the coherent transmission capability information may merely include some states, and each state may represent whether all the antennas for the UE are capable of being used for the coherent transmission or incapable of being used for the coherent transmission, or merely parts of the antennas for the UE are capable of being used for the coherent transmission, as shown in the following table:

| State | Meaning |
|---|---|
| 1 | None transmission chains can coherent transmission (None of the antennas is capable of being used for the coherent transmission) |
| 2 | Partial transmission chains can coherent transmission (Parts of the antennas are capable of being used for the coherent transmission) |
| 3 | All transmission chains can coherent transmission (All the antennas are capable of being used for the coherent transmission) |
| 4 | Reserved |

When parts of the antennas are capable of being used for the coherent transmission, the maximum or minimum quantity of the antennas capable of being used for the coherent transmission simultaneously may be determined. The maximum quantity or the minimum quantity may be carried in dedicated information or acquired through agreement. For example, it may be agreed that two antennas are capable of being used for the coherent transmission, i.e., the UE may include several antenna groups, each antenna group may include two antennas, the antennas in each antennas group may be used for the coherent transmission, and the antennas in different antenna groups may not be used for the coherent transmission.

In another possible embodiment of the present disclosure, each state in the coherent transmission capability information may represent the maximum quantity of antennas capable of being used for the coherent transmission, as shown in the following tables:

| State | The maximum quantity of antennas capable of being used for the coherent transmission |
|---|---|
| 1 | 1 |
| 2 | 2 |
| 3 | 4 |
| 4 | Reserved | or,

| State | The maximum quantity of antennas capable of being used for the coherent transmission |
|---|---|
| 1 | 1 |
| 2 | The maximum quantity of antennas supported by the UE |
| 3 | 2 |
| 4 | 4 |

In yet another possible embodiment of the present disclosure, each state in the coherent transmission capability information may represent the minimum quantity of antennas capable of being used for the coherent transmission, as shown in the following tables:

| State | The minimum quantity of antennas capable of being used for the coherent transmission |
|---|---|
| 1 | 1 |
| 2 | 2 |
| 3 | 4 |
| 4 | Reserved | or,

| State | The minimum quantity of antennas capable of being used for the coherent transmission |
|---|---|
| 1 | 1 |
| 2 | The maximum quantity of antennas supported by the UE |
| 3 | 2 |
| 4 | 4 |

The minimum quantity of antennas for the UE capable of being used for the coherent transmission simultaneously may be, when the antennas capable of being used for the coherent transmission are considered to belong to a same coherent transmission antennas group, a minimum value of the quantities of antennas in all the coherent transmission antenna groups.

In a possible embodiment of the present disclosure, two bits may be used to indicate the coherent transmission capability of antenna in the UE.

In some embodiments of the present disclosure, in Step 2, when the base station determines the configuration information about the one or more uplink reference signal resources and transmits the configuration information to the UE, the configuration of the one or more uplink reference signal resources and the group information about the uplink reference signal ports in the coherent transmission relationship information may be provided in the following modes.

Mode 1: the base station may configure one or more uplink reference signal resources, and parts of the uplink reference signal ports in each uplink reference signal resource may be capable of being used for the coherent transmission.

Mode 2: the base station may configure one or more uplink reference signal resources, the uplink reference signal ports in each uplink reference signal resource may be capable of being used for the coherent transmission, and the uplink reference signal ports in different uplink reference signal resources may be incapable of being used for the coherent transmission.

Mode 3: the base station may configure a plurality of uplink reference signal resources, the uplink reference signal ports in each uplink reference signal resource may be capable of being used for the coherent transmission, and the uplink reference signal ports in parts of the uplink reference signal resources may also be capable of being used for the coherent transmission.

Mode 4: the base station may configure a plurality of uplink reference signal resources, parts of the uplink reference signal ports in one uplink reference signal resource and parts of the uplink reference signal ports in another uplink reference signal resource may be capable of being used for the coherent transmission.

Mode 5: the base station may configure a plurality of uplink reference signal resources divided into a plurality of resource groups, all the uplink reference signal resources in a same resource group may have the same quantity of uplink reference signal ports, and any two uplink reference signal resources in the same resource group may have a same coherent transmission relationship among the uplink reference signal ports in the uplink reference signal resource. In a possible embodiment of the present disclosure, any two uplink reference signal resources in the same resource group may not be used for the transmission of the uplink reference signal simultaneously.

Mode 6: the base station may configure a plurality of uplink reference signal resources divided into a plurality of resource groups, and any two resource groups may include a same configuration of the uplink reference signal resources and a same coherent transmission relationship among the uplink reference signal ports in the uplink reference signal resources in each resource group. In a possible embodiment of the present disclosure, any two resource groups may not be used for the transmission of the uplink reference signal simultaneously.

For Step 2, the base station may notify the configuration information about the one or more uplink reference signal resources to the UE, and the configuration information may include the quantity of the uplink reference signal resources and the quantity of the uplink reference signal ports in each uplink reference signal resource.

In Modes 1, 5 and 6, in a possible embodiment of the present disclosure, the configuration information about the one or more uplink reference signal resources transmitted by the base station to the UE may include the information about the coherent transmission relationship among the uplink reference signal ports in each uplink reference signal resource.

In a possible embodiment of the present disclosure, the configuration information may include the quantity of the uplink reference signal resources and the quantity of the uplink reference signal ports in each uplink reference signal resource.

The information about the coherent transmission relationship may be a mapping between the uplink reference signal ports and the antenna groups, or a mapping between the uplink reference signal resources and the antenna groups.

In a possible embodiment of the present disclosure, prior to transmitting the one or more uplink reference signals based on the configuration information about the one or more uplink reference signal resources, the uplink transmission method may further include determining the coherent transmission relationship among the uplink reference signal ports in each uplink reference signal resource configured by the base station for the UE based on the coherent transmission capability of the UE and the configuration information about the one or more uplink reference signal resources, and a mapping between the coherent transmission relationship and the coherent transmission capability of the UE is pre-defined. The transmitting the one or more uplink reference signals based on the configuration information about the one or more uplink reference signal resources may include determining antennas for the transmission of the one or more uplink reference signals based on the coherent transmission relationship, and the one or more uplink reference signals may be transmitted on the uplink reference signal ports capable of being used for the coherent transmission through the antennas capable of being used for the coherent transmission.

The receiving the indication information about the uplink transmission determined by the base station and performing the uplink transmission may include: receiving the indication information about the uplink transmission, the indication information including an SRI, or a TPMI and a TRI, or the TPMI, the TRI and the SRI; and determining a precoding matrix, the quantity of transmission layers and the antennas to be used for the uplink transmission based on the indication information.

The information about the coherent transmission relationship among the uplink reference signal ports may be used to indicate the uplink reference signal ports capable of being used for the coherent transmission and the uplink reference signal ports incapable of being used for the coherent transmission in the following methods.

Method 1: the base station may merely indicate information about the uplink reference signal port group capable of being used for the coherent transmission, and the uplink reference signal ports in different groups may be incapable of being used for the coherent transmission by default. Taking one uplink reference signal resource as an example, when the uplink reference signal resource includes four uplink reference signal ports, the base station may merely indicate that a first uplink reference signal port and a second uplink reference signal port are capable of being used for the coherent transmission. Upon the receipt of the indication information, the UE may consider that the first and second uplink reference signal ports form an uplink reference signal port group capable of being used for the coherent transmission, a third uplink reference signal port forms another uplink reference signal port group and a fourth uplink reference signal port forms yet another uplink reference signal port group. The uplink reference signal ports in these groups may be incapable of being used for the coherent transmission. The UE may select two antennas capable of being used for the coherent transmission to transmit the uplink reference signal corresponding to the first and second uplink reference signal ports, and select two other antennas to transmit the uplink reference signal corresponding to the third and fourth uplink reference signal ports. The antennas for transmitting the uplink reference signal corresponding to the third and fourth uplink reference signal ports and the antennas for transmitting the uplink reference signal corresponding to the first and second uplink reference signal ports may belong to a same antenna group capable of being used for the coherent transmission, or belong to different antenna groups. In a possible embodiment of the present disclosure, the antennas for transmitting the uplink reference signals corresponding to the three uplink reference signal port groups may belong to different antenna groups capable of being used for the coherent transmission.

For another example, the base station may indicate that the first and second uplink reference signal ports are capable of being used for the coherent transmission, and the third and the fourth uplink reference signal ports are capable of being used for the coherent transmission. Upon the receipt of the indication information, the UE may consider that the first and second uplink reference signal ports form one uplink reference signal port group capable of being used for the coherent transmission, and the third and fourth uplink reference signal ports form another uplink reference signal port group capable of being used for the coherent transmission. The coherent transmission may not be implemented between the uplink reference signal ports in the two groups. The UE may select two antennas from an antenna group capable of being used for the coherent transmission and including at least two antennas for the transmission of the uplink reference signals corresponding to the first uplink reference signal port and the second uplink reference signal port respectively, and select two antennas from the other antennas for the transmission of the uplink reference signals corresponding to the third and fourth uplink reference signal ports respectively. This example may be applied to a situation where the base station has configured a plurality of uplink reference signal resources, so as to indicate the configuration information about each uplink reference signal resource.

Method 2: the base station may indicate the coherent transmission relationships among all the uplink reference signal ports, e.g., the quantity of the uplink reference signal port groups and the quantity of the uplink reference signal ports in each uplink reference signal port group. The base station and the UE may determine, by default, that the uplink reference signal ports in the same uplink reference signal port group are capable of being used for the coherent transmission, and the uplink reference signal ports in different uplink reference signal port groups are incapable of being used for the coherent transmission. The UE may determine the antennas corresponding to each uplink reference signal port based on the coherent transmission relationship among the uplink reference signal ports indicated by the base station, so as to ensure that the antennas capable of being used for the coherent transmission correspond to uplink reference signal ports capable of being used for the coherent transmission. In this case, in a possible embodiment of the present disclosure, the quantity of the uplink reference signal ports corresponding to each uplink reference signal resource or the total quantity of the uplink reference signal ports may not be explicitly indicated in the configuration information about the one or more uplink reference signal resources.

Method 3: in a possible embodiment of the present disclosure, the configuration information about the one or more uplink reference signal resources may include the total quantity of the uplink reference signal ports in all the uplink reference signal resources or the quantity of the uplink reference signal ports in each uplink reference signal resource. When the uplink reference signal ports capable of being used for the coherent transmission form one uplink reference signal port group, in a possible embodiment of the present disclosure, the UE must map the uplink reference signal port group consisting of more uplink reference signal ports capable of being used for the coherent transmission to smaller serial numbers of the uplink reference signal ports, and map the uplink reference signal port group consisting of fewer uplink reference signal ports to larger serial numbers of the uplink reference signal ports. In this way, when one uplink reference signal resource is configured by the base station, it is able to map the information about the coherent transmission relationship among the uplink reference signal ports through fewer bits. For example, when one uplink reference signal resource including four uplink reference signal ports have been configured by the base station, the coherent transmission relationships among the uplink reference signal ports may merely include (1,1,1,1), (2,1,1), (2,2), (3,1) and (4), which need to be indicated through three bits. (X1, X2, X3, X4) represents that there are four uplink reference signal port groups. A first group may include X1 uplink reference signal ports, a second group may include X2 uplink reference signal ports, . . . , the uplink reference signal ports in each group may be capable of being used for the coherent transmission, and the uplink reference signal ports in different groups may be incapable of being used for the coherent transmission. Fewer bits may be required on the basis of the transmission capability of the UE. For example, when the UE is capable of supporting at most two uplink reference signal ports for the coherent transmission, the coherent transmission relationships may merely include (1,1,1,1), (2,1,1) and (2,2), and at this time merely two bits may be required. In a possible embodiment of the present disclosure, the coherent transmission relationships among the uplink reference signal ports and the quantity of the uplink reference signal ports in the uplink reference signal resource may be encoded jointly. For example, when one uplink reference signal resource has been configured by the base station and the quantities of the uplink reference signal ports in the reference signal resource are 2 and 4, there may at most exist the following coherent transmission relationships among the uplink reference signal ports: (1,1), (2), (1,1,1,1), (2,1,1), (2,2), (3,1) and (4), and at this time totally three bits may be used to indicate the quantity of the uplink reference signal ports in the uplink reference signal resource and the coherent transmission relationships among the uplink reference signal ports. As mentioned hereinabove, fewer bits may be required on the basis of the transmission capability of the UE. In other words, the quantity of the bits for indicating the coherent transmission relationships among the uplink reference signal ports, or the quantity of the bits for indicating the coherent transmission relationships among the uplink reference signal ports and the quantity of the uplink reference signal ports, may be determined based on the coherent transmission capability of the UE and the quantity of the uplink reference signal ports allowed to be configured in the uplink reference signal resource.

Method 4: the base station may configure a plurality of uplink reference signal resources, the coherent transmission relationship among the uplink reference signal ports in one uplink reference signal resource may be indicated, and this coherent transmission relationship may be applied to all the uplink reference signal resources. The coherent transmission relationship among the uplink reference signal ports in the uplink reference signal resource may be indicated in the above method 1, 2 or 3 (this mode may be applied to beam management in a scenario where transmission or reception beams are scanned; different uplink reference signal resources may correspond to different transmission beams or reception beams). The UE may determine the antennas corresponding to each uplink reference signal port based on the coherent transmission relationship among the uplink reference signal ports in the uplink reference signal resource indicated by the base station, so as to ensure that the antennas for transmitting the uplink reference signal ports capable of being used for the coherent transmission are antennas capable of being used for the coherent transmission. The UE may transmit the one or more uplink reference signals on different uplink reference signal resources through a same antenna.

Method 5: the base station may configure a plurality of uplink reference signal resource groups, each uplink reference signal resource group may include one or more uplink reference signal resources, and the coherent transmission relationship among the uplink reference signal ports in one uplink reference signal resource may be indicated. This coherent transmission relationship may be applied to all the uplink reference signal resources in the same group. The coherent transmission relationship among the uplink reference signal ports in the uplink reference signal resource may be indicated in the above method 1, 2 or 3. The UE may determine the antennas corresponding to each uplink reference signal port based on the coherent transmission relationship among the uplink reference signal ports in the uplink reference signal resource indicated by the base station, so as to ensure that the antennas for transmitting the uplink reference signal ports capable of being used for the coherent transmission are antennas capable of being used for the coherent transmission. The UE may transmit the one or more uplink reference signals on different uplink reference signal resources through a same antenna.

Method 6: the base station may configure a plurality of uplink reference signal resource groups, and the coherent transmission relationship among the uplink reference signal ports in one uplink reference signal resource group may be indicated by the base station. This coherent transmission relationship may be applied to all the uplink reference signal resource groups. The coherent transmission relationship among the uplink reference signal ports in the uplink reference signal resource group may be indicated in the above method 1, 2 or 3 (in one scenario, different uplink reference signal resource groups may correspond to different transmission beams or different reception beams). The UE may determine the antennas corresponding to each uplink reference signal port based on the coherent transmission relationship among the uplink reference signal ports in the uplink reference signal resources in one uplink reference signal resource group indicated by the base station, so as to ensure that the antennas for transmitting the uplink reference signal ports capable of being used for the coherent transmission are antennas capable of being used for the coherent transmission. The UE may transmit the one or more uplink reference signals on different uplink reference signal resource groups through a same antenna.

In Mode 1, in a possible embodiment of the present disclosure, the base station may merely configure one uplink reference signal resource, and the UE and the base station may, by default, determine the coherent transmission relationship among the uplink reference signal ports in the uplink reference signal resource corresponds to the coherent transmission capability reported by the UE. For example, when the an $(NK)^{th}$ antenna group capable of being used for the coherent transmission reported by the UE include Mk antennas, first M1 uplink reference signal ports in the uplink reference signal resource configured by the base station may correspond to a first antenna group reported by the UE, . . . , and $$\left(\sum_{i=1}^{k-1} M_i + 1\right)^{th} \text{ to } \left(\sum_{i=1}^{k} M_i\right)^{th}$$

uplink reference signal ports in the uplink reference signal resource configured by the base station may correspond to a $k^{th}$ antenna group reported by the UE, and so on. This mode may be applied to a situation where one uplink reference signal resource corresponds to a plurality of antenna groups capable of being used for the coherent transmission. For example, the base station may configure two uplink reference signal resources, a first uplink reference signal resource may correspond to first X1 antenna groups capable of being used for the coherent transmission reported by the UE, and a second uplink reference signal resource may correspond to $(X1+0)^{th}$ to $(X2)^{th}$ antenna groups capable of being used for the coherent transmission reported by the UE. Upon the receipt of the configuration information about the one or more uplink reference signal resources from the base station, the UE may determine the antennas for the transmission of each uplink reference signal resource in this default mode.

The above method may be easily applied to a situation where a plurality of uplink reference signal resources have been configured by the base station, e.g., a situation corresponding to the above methods 4 to 6, which will not be particularly defined herein. For example, the base station may configure a plurality of uplink reference signal resources, and the UE and the base station may, by default, determine that the coherent transmission relationship among the uplink reference signal ports in each uplink reference signal resource configured by the base station corresponds to the coherent transmission capability reported by the UE. For instance, when the $(NK)^{th}$ antenna group capable of being used for the coherent transmission reported by the UE includes Mk antennas, first M1 uplink reference signal ports in each uplink reference signal resource configured by the base station may correspond to a first antenna group reported by the UE, . . . , and $$\left(\sum_{i=1}^{k-1} M_i + 1\right)^{th} \text{ to } \left(\sum_{i=1}^{k} M_i\right)^{th}$$

uplink reference signal ports in the uplink reference signal resource configured by the base station may correspond to a $k^{th}$ antenna group reported by the UE, and so on. Upon the receipt of the configuration information about the uplink reference signal resources from the base station, the UE may determine the antennas for the transmission of each uplink reference signal resource in this default mode.

In Mode 2 (or Modes 5 and 6 corresponding to Mode 2), when the configuration information about the one or more uplink reference signal resources includes the information about the quantity of the uplink reference signal ports in each uplink reference signal resource, the UE may determine the corresponding antennas s based on the quantity of the uplink reference signal ports in each uplink reference signal resource. The UE needs to ensure that the antennas s for the transmission of the uplink reference signals corresponding to one uplink reference signal resource are capable of being used for the coherent transmission. In a possible embodiment of the present disclosure, the antennas for the transmission of the uplink reference signals for the three uplink reference signal port groups may belong to different antenna groups capable of being used for the coherent transmission.

In Mode 2 (or Modes 5 and 6 corresponding to Mode 2), in a possible embodiment of the present disclosure, the configuration information about the one or more uplink reference signal resources transmitting by the base station may not include the information about the quantity of the uplink reference signal ports in each uplink reference signal resource. When the $(NK)^{th}$ antenna group capable of being used for the coherent transmission reported by the UE includes Mk antennas, a first uplink reference signal resource configured by the base station may include M1 uplink reference signal ports corresponding to a first antenna group reported by the UE, . . . , and a $K^{th}$ uplink reference signal resource configured by the base station includes Mk uplink reference signal ports corresponding to a $k^{th}$ antenna group reported by the UE, and so on. The total quantity of the uplink reference signal ports in all the uplink reference signal resources configured by the base station may be equal to, or not equal to, the total quantity of the antennas reported by the UE. In a possible embodiment of the present disclosure, the base station may transmit the information about the total quantity of the uplink reference signal ports in all the uplink reference signal resources.

In Mode 3 (or Modes 5 and 6 corresponding to Mode 3), in a possible embodiment of the present disclosure, the configuration information about the one or more uplink reference signal resources transmitted by the base station may include the information about the coherent transmission relationship among the uplink reference signal resources. The information about the coherent transmission relationship among the uplink reference signal resources may be used to indicate the uplink reference signal ports in each uplink reference signal resource capable of being used for the coherent transmission, and the uplink reference signal ports in each uplink reference signal resource incapable of being used for the coherent transmission in the following methods.

Method 1': the base station may merely indicate information about the uplink reference signal resource group capable of being used for the coherent transmission, and the uplink reference signal resources in different groups may be incapable of being used for the coherent transmission by default. When the base station has configured four uplink reference signal resources and a first uplink reference signal resource and a second uplink reference signal resource are capable of being used for the coherent transmission, the UE may, upon the receipt of the indication information, consider that the first and second uplink reference signal resources form an uplink reference signal resource group capable of being used for the coherent transmission, a third uplink reference signal resource forms another uplink reference signal resource group and a fourth uplink reference signal resource forms yet another uplink reference signal resource group. The coherent transmission may be incapable of being performed among these uplink reference signal resource groups. The UE may select antennas capable of being used for the coherent transmission and in a same amount as the quantity of the uplink reference signal ports in the first and second uplink reference signal resources to transmit the first and second uplink reference signal resources, select antennas capable of being used for the coherent transmission and in a same amount as the quantity of the uplink reference signal ports in the third uplink reference signal resource to transmit the third uplink reference signal resource, and select antennas capable of being used for the coherent transmission and in a same amount as the quantity of the uplink reference signal ports in the fourth uplink reference signal resource to transmit the fourth uplink reference signal resource. The antennas for transmitting the third and fourth uplink reference signal resources and the antennas for transmitting the first and second uplink reference resources may belong to a same antenna group capable of being used for the coherent transmission, or belong to different antenna groups. In a possible embodiment of the present disclosure, the antennas for transmitting the three uplink reference signal resource groups may belong to different antenna groups capable of being used for the coherent transmission.

Method 2': the base station may indicate the coherent transmission relationships among all the uplink reference signal resources, e.g., the quantity of the uplink reference signal resource groups and the quantity of the uplink reference signal resources in each uplink reference signal resource group. The UE may determine the antennas corresponding to each uplink reference signal resource based on the coherent transmission relationship among the uplink reference signal resources indicated by the base station, so as to ensure that the antennas for transmitting the uplink reference signal ports in each uplink reference signal resource capable of being used for the coherent transmission are antennas capable of being used for the coherent transmission.

Method 3': the base station may configure a plurality of uplink reference signal resource groups, and the coherent transmission relationship among the uplink reference signal resources in one uplink reference signal resource group may be indicated. This coherent transmission relationship may be applied to all the uplink reference signal resource groups. The coherent transmission relationship among the uplink reference signal resources in the uplink reference signal resource group may be indicated in the above method 1' or 2'. The UE may determine the antennas corresponding to the uplink reference signal ports in each uplink reference signal resource based on the coherent transmission relationship among the uplink reference signal resources in the uplink reference signal resource group indicated by the base station, so as to ensure that the antennas for transmitting the uplink reference signal ports in each uplink reference signal resource capable of being used for the coherent transmission are antennas capable of being used for the coherent transmission. The UE may transmit the one or more uplink reference signals on the uplink reference signal resources in different uplink reference signal resource groups through a same antenna.

Methods 4', 5' and 6' may be similar to the above-mentioned Methods 4, 5 and 6 respectively.

In a possible embodiment of the present disclosure, the base station may notify the configuration information about the one or more uplink reference signal resources to the UE, and the configuration information may include information about a mapping between the uplink reference signal resources and the antenna groups capable of being used for the coherent transmission reported by the UE or information about a mapping between the uplink reference signal ports in the one or more uplink reference signal resources and the antenna groups capable of being used for the coherent transmission reported by the UE.

In a possible embodiment of the present disclosure, when the base station does not transmit any coherent transmission relationship among the uplink reference signal ports, the UE must transmit the one or more uplink reference signals on the same uplink reference signal resource through the antennas capable of being used for the coherent transmission.

In a possible embodiment of the present disclosure, when the base station does not transmit any coherent transmission relationship among the uplink reference signal ports, the UE may consider that the uplink reference signals may be transmitted on the same uplink reference signal resource through the antennas incapable of being used for the coherent transmission.

In a possible embodiment of the present disclosure, when the base station does not transmit any coherent transmission relationship among the uplink reference signal ports, the UE may consider that the uplink reference signals may be transmitted on different uplink reference signal resources through the antennas incapable of being used for the coherent transmission.

In some embodiments of the present disclosure, in Step 3, when transmitting the one or more uplink reference signals on the one or more uplink reference signal resources configured by the base station, the UE may determine the antennas corresponding to each uplink reference signal port in each uplink reference signal resource based on the configuration information about the one or more uplink reference signal resources.

In some embodiments of the present disclosure, in Step 4, the base station may receive the one or more uplink reference signals from the UE, and determine the SRI, and/or the TPMI, the TRI and the MCS.

The base station may receive the one or more uplink reference signals from the UE, and determine the quantity of layers, the precoding matrix and the uplink reference signal resources for the uplink transmission based on a certain rule. The rule may be a rule of maximum RSRP, a rule of maximum throughput, or a rule with an inter-user interference is taken into consideration.

When the base station merely configures one uplink reference signal resource for the UE, it is unnecessary to select the uplink reference signal resource.

When each uplink reference signal resource configured by the base station for the UE merely includes one uplink reference signal port, it is merely necessary to select the SRI, without any necessity to select the precoding matrix. At this time, the quantity of transmission layers may be equal to the quantity of the selected uplink reference signal resources.

In a possible embodiment of the present disclosure, the base station may determine the quantity of transmission layers, the precoding matrix and the uplink reference signal resources for the uplink transmission based on the information about the coherent transmission relationship among the uplink reference signal ports corresponding to the configuration information about the one or more uplink reference signal resources. To be specific, when selecting the precoding matrix, the base station may merely select the precoding matrix based on the information about the coherent transmission relationship among the uplink reference signal ports corresponding to the configuration information about the one or more uplink reference signal resources, but may not select the precoding matrix beyond the range of the information about the coherent transmission relationship. For example, the uplink reference signal resource configured by the base station may include four uplink reference signal ports, and the base station may indicate that merely first and second uplink reference signal ports are capable of being used for the coherent transmission. During the selection of the precoding matrix, the base station may merely select the precoding matrix from precoding matrices in each of which the total quantity of uplink reference signal ports is 4 and merely the first and second uplink reference signals are capable of being used for the coherent transmission. Candidate precoding matrices may include precoding matrices in each of which the first and second uplink reference signal ports are incapable of being used for the coherent transmission. The precoding matrix in which two uplink reference signal ports are capable of being used for the coherent transmission may refer to a precoding matrix in which the two uplink reference signal ports have non-zero values corresponding to at least one layer, i.e., the two uplink reference signal ports may be used for the transmission of data in a same layer simultaneously.

In a possible embodiment of the present disclosure, the base station may select the precoding matrix for each uplink reference signal resource.

In a possible embodiment of the present disclosure, the base station may implement an ergodic process of a set of all possible combinations of simultaneously-transmitted uplink reference signal resources, so as to select the optimum precoding matrix. The combination of the simultaneously-transmitted uplink reference signal resources may refer to a combination in which one or more uplink reference signal resources are transmitted simultaneously. For example, when the base station has configured three uplink reference signal resources, the set of all possible combinations of the simultaneously-transmitted uplink reference signal resources may include {merely a first uplink reference signal resource is used for the transmission of the uplink reference signal, merely a second uplink reference signal resource is used for the transmission of the uplink reference signal, merely a third uplink reference signal resource is used for the transmission of the uplink reference signal, the first and second uplink reference signal resources are used for the transmission of the uplink reference signal, the first and third uplink reference signal resources are used for the transmission of the uplink reference signal, the second and third uplink reference signal resources are used for the transmission of the uplink reference signal, and the first, second and third uplink reference signal resources are used for the transmission of the uplink reference signal}. To be specific, the base station may select the precoding matrix from a codebook corresponding to the total quantity of the uplink reference signal ports in all the simultaneously-transmitted uplink reference signal resources or from a codebook corresponding to each uplink reference signal resource, and the precoding matrices corresponding to the uplink reference signal resources may form a precoding matrix after the transformation of weight values.

In a possible embodiment of the present disclosure, the base station may implement an ergodic process of a set of all possible combinations of simultaneously-transmitted uplink reference signal resources in each of the uplink reference signal resource group, so as to select one uplink reference signal resource group, the uplink reference signal resources corresponding to the group, the precoding matrix and the quantity of transmission layers.

In a possible embodiment of the present disclosure, the base station may implement an ergodic process of a set of combinations of simultaneously-transmitted uplink reference signal resources corresponding to at most one uplink reference signal resource selected from each uplink reference signal resource group, so as to select the optimum precoding matrix.

In the embodiments of the present disclosure, in Step 5, the base station may transmit the indication information including the SRI, TPMI and TRI for the uplink transmission to the UE.

When merely one uplink reference signal resource has been configured by the base station for the UE, the indication information does not need to include the SRI.

When a plurality of uplink reference signal resources have been configured by the base station for the UE, the indication information needs to include the SRI. SRI may be used to indicate merely one uplink reference signal resource, or a plurality of uplink reference signal resources.

When a plurality of uplink reference signal resources has been configured by the base station for the UE and each uplink reference signal resource merely includes one uplink reference signal port, the indication information may merely include the SRI rather than the TPMI and the TRI. The quantity of the uplink reference signal resources corresponding to the SRI may be equal to the quantity of data layers.

The SRI may be encoded independently, e.g., in the form of bitmap, i.e., one bit may correspond to one uplink reference signal resource, one state of each bit represents that the uplink reference signal resource has been selected and another state represents that the uplink reference signal resource has not been selected. For example, when four uplink reference signal resources have been configured by the base station, four bits may be used to indicate the uplink reference signal resources. A state 1 of each bit represents that the uplink reference signal resource has been selected, a state 0 represents that the uplink reference signal resource has not been selected. 1101 represents that first, second and fourth uplink reference signal resources have been selected. The SRI may also be encoded in a joint manner, i.e., the ergodic process is implemented for all the combinations of the uplink reference signal resources so as to encode the SRI in a joint manner. When four uplink reference signal resources have been configured by the base station, there may exist $C_4^k$ possibilities if k uplink reference signal resources are selected, the total quantity of possibilities may be $$\sum_{k=1}^{4} C_4^k,$$

so the SRI may be encoded using $$\left\lceil \log \sum_{k=1}^{4} C_4^k \right\rceil$$

bits. When a plurality of uplink reference signal resource groups has been configured by the base station and the UE is merely capable of at most transmitting the uplink reference signals on one uplink reference signal resource in one uplink reference signal resource group and the uplink reference signal resources in the other uplink reference signal resource groups, the quantity of the combinations of the selected uplink reference signal resources may be smaller than the quantity of the combinations of the ergodic uplink reference signal resource groups.

For simplicity, the following description will be given when the SRI indicates one uplink reference signal resource. Of course, the SRI may indicate each of a plurality of uplink reference signal resources, or indicate a plurality of uplink reference signal resources in a joint manner.

The TPMI and the TRI may each be encoded independently or jointly. When they are encoded independently, the DCI may include a dedicated region for indicating the TRI, and another dedicated region for indicating the TPMI.

In a possible embodiment of the present disclosure, the quantity of encoding states of the TPMI may be determined based on the TRI, i.e., the TPMI may be indicated merely after all codewords corresponding to the TRI are renumbered. For example, when one uplink reference signal resource includes four uplink reference signal ports, a codebook of the four uplink reference signal ports may include T1, T2, T3 or T4 codewords when TRI=1, 2, 3 or 4. When TRI=m, the uplink precoding matrices may merely exist in all the codewords for TRI=m, and one encoding state of the TPMI may correspond to one codeword when TRI=m. In one mode, the quantity of the encoding bits of the TPMI may be determined based on the TRI, e.g., the TPMI may be encoded through log(Tm) bits. In another mode, the quantity of the encoding bits of the TPMI may be determined based on the maximum one of the quantities of codewords corresponding to the possible TRIs, e.g., the TPMI may be encoded through max log(Tm) bits. When the quantity of the states corresponding to the quantity of the encoding bits is greater than the quantity of the codewords when TRI=m, the remaining states may be reserved states.

In a possible embodiment of the present disclosure, for Step 5, the base station may determine a searching range of the precoding matrices based on the information about the coherent transmission relationship among the uplink reference signal ports. The quantity of the encoding states of the TPMI may be determined based on the TRI and the information about the coherent transmission relationship among the uplink reference signal ports. The quantity of the encoding states of the TPMI may correspond to the TRI as well as the quantity of the precoding matrices for the coherent transmission relationship among the uplink reference signal ports. In one mode, the quantity of the encoding bits of the TPMI may be determined based on the TRI and the information about the coherent transmission relationship among the uplink reference signal ports, e.g., when TRI=m, the quantity of the precoding matrices for the coherent transmission relationship among the uplink reference signal ports is Sm, the TPMI may be encoded through log(Sm) bits. In another mode, the quantity of the encoding bits of the TPMI may be determined based on the maximum one of the quantities of the codewords corresponding to the possible TRIs for the information about the coherent transmission relationship among the uplink reference signal ports, e.g., the TPMI may be encoded through max log(Sm) bits. When the quantity of the states corresponding to the quantity of the encoding bits is greater than the quantity of the codewords when TRI=m, the remaining states may be reserved states.

The quantity of encoding bits of the independently-encoded TRI may be determined based on all possible values of the TRI. In one mode, all the possible values of the TRI may be determined based on the quantity of the uplink reference signal ports in the uplink reference signal resources. For example, all the possible values of the TRI may be positive integers each smaller than or equal to the quantity of the uplink reference signal ports in the uplink reference signal resources. In another mode, all the possible values of the TRI may be determined based on the quantity of the uplink reference signal ports in the uplink reference signal resources and the maximum quantity of transmission layers supported by the UE, i.e., all the possible values of the TRI may be positive integers each smaller than or equal to a minimum value of the quantity of the uplink reference signal ports in the uplink reference signal resources and the maximum quantity of transmission layers supported by the UE.

The TPMI and the TRI may be indicated through joint encoding.

When the TPMI and the TRI are encoded jointly, the total quantity of active encoding states may be a sum of the quantities of all possible precoding matrices corresponding to all the TRIs. When the quantity of the states corresponding to the quantity of the encoding bits is greater than the quantity of the active encoding states, the remaining states may be reserved states.

In a possible embodiment of the present disclosure, for Step 5, the base station may determine the searching range of the precoding matrices based on the information about the coherent transmission relationship among the uplink reference signal ports. The quantity of active encoding states of the TPMI and the TRI which are encoded jointly may be equal to a sum of the quantities of the precoding matrices for the coherent transmission relationship among the uplink reference signal ports corresponding to all possible values of the TRI. When the quantity of the states corresponding to the quantity of the encoding bits is greater than the quantity of the active encoding states, the remaining states may be reserved states.

The SRI, the TPMI and the TRI may also be indicated through joint encoding. The total quantity of active encoding states may be a sum of the quantities of all possible precoding matrices corresponding to all the TRIs corresponding to all the uplink reference signal resources, or a sum of the quantities of all possible precoding matrices corresponding to all the TRIs corresponding to the set of all possible combinations of the simultaneously-transmitted uplink reference signal resources. When the quantity of the states corresponding to the quantity of the encoding bits is greater than the quantity of the active encoding states, the remaining states may be reserved states.

In a possible embodiment of the present disclosure, the base station may indicate the TPMI and the TRI separately for each selected uplink reference signal resource.

In a possible embodiment of the present disclosure, the base station may indicate the TPMI and the TRI jointly for each selected uplink reference signal resource.

In a possible embodiment of the present disclosure, the base station may indicate each uplink reference signal resource group, and the indication information may be encoded independently, or jointly with the other information.

In this step, the TPMI, the TRI, the SRI and the encoding mode of the uplink reference signal resource groups need to be agreed in advance between the base station and the UE.

In the embodiments of the present disclosure, in Step 6, the UE may determine the TPMI and the quantity of the data streams for the uplink transmission. To be specific, the UE may receive the indication information indicating the SRI, or the TPMI and the TRI, or the TPMI, the TRI and the SRI from the base station. In a possible embodiment of the present disclosure, the UE may receive the indication information about the uplink reference signal resource groups, and determine the precoding matrix, the quantity of the transmission layers and the used antennas for the uplink transmission. The antennas used by the UE for the uplink transmission may be the antennas used for the transmission of the uplink reference signals corresponding to the uplink reference signal resources indicated by the SRI.

In some embodiments of the present disclosure, in a second implementation mode as shown in FIG. 1, the uplink transmission method may include the following steps.

Step 31: transmitting the coherent transmission capability information about the UE to the base station. The coherent transmission capability information about the UE may be the coherent transmission capability of the antennas supported by the UE. The antennas may be physical antennas, transmission chains, TXRUs or uplink reference signal ports.

Step 32: receiving the configuration information about the one or more uplink reference signal resources determined by the base station based on the coherent transmission capability information about the UE.

Prior to transmitting the coherent transmission capability information about the UE to the base station, the uplink transmission method may further include the following steps.

Step 33: receiving the information about the coherent transmission relationship among the uplink reference signal ports in the one or more uplink reference signal resources from the base station. The information about the coherent transmission relationship may be information about the coherent transmission relationship among the uplink reference signal ports in each uplink reference signal resource. The information about the coherent transmission relationship may be included in the configuration information about the one or more uplink reference signal resources, or information indicated separately. The information about the coherent transmission relationship may be determined based on the coherent transmission capability information.

Step 34: receiving, by the UE, contents in the indication information about the uplink transmission determined by the base station based on the coherent transmission relationship and the received uplink reference signals.

In the embodiments of the present disclosure, a mapping between the coherent transmission relationship and the coherent transmission capability of the UE may be predefined.

Figure 3:
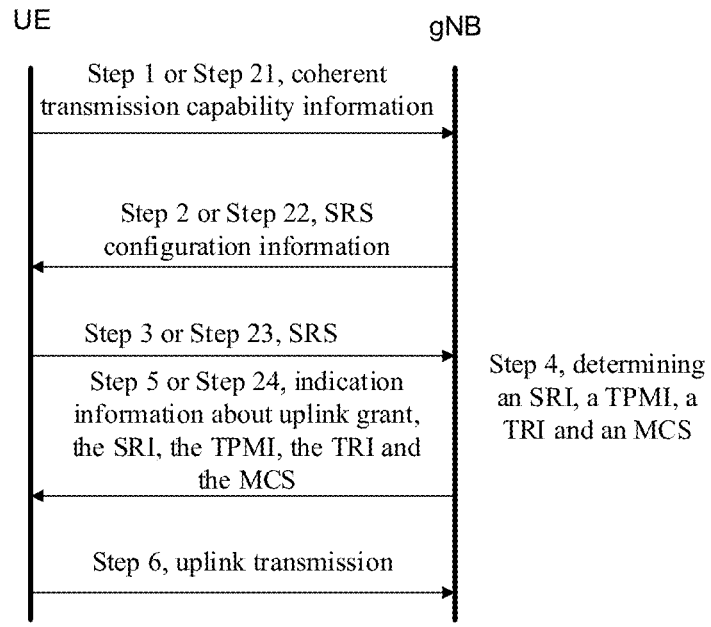
FIG. 3 is another schematic view showing the interaction procedure when a second implementation mode for the uplink transmission method in FIG. 1 is adopted.

To be specific, as shown in FIG. 3, the uplink transmission method may include the following steps.

Step 1: reporting, by the UE, the coherent transmission capability.

Step 2: determining, by the base station, the configuration information about the one or more uplink reference signal resources based on the coherent transmission capability of the UE, and transmitting the configuration information to the UE.

Step 3: transmitting, by the UE, the one or more uplink reference signals based on the one or more uplink reference signal resources configured by the base station.

To be specific, the UE may determine the antennas corresponding to each uplink reference signal port in each uplink reference signal resource based on the configuration information about the one or more uplink reference signal resources and the predefined mapping between the coherent transmission relationship among the uplink reference signal ports and the coherent transmission capability of the UE.

Step 4: receiving, by the base station, the one or more uplink reference signals from the UE, and determining the TPMI, the TRI and an MCS level.

Step 5: transmitting, by the base station, the SRI, the TPMI and the TRI for the uplink transmission to the UE.

Step 6: determining, by the UE, the TPMI and the quantity of the data streams for the uplink transmission.

In Step 2, the base station may determine the configuration information about the one or more uplink reference signal resources based on the coherent transmission capability of the UE and transmit the configuration information to the UE in the following modes.

Mode 1: the base station may configure one or more uplink reference signal resources, and parts of, or all of, the uplink reference signal ports in each uplink reference signal resource may be capable of being used for the coherent transmission.

Mode 2: the base station may configure one or more uplink reference signal resources, the uplink reference signal ports in each uplink reference signal resource may be capable of being used for the coherent transmission, and the uplink reference signal ports in different uplink reference signal resources may be incapable of being used for the coherent transmission.

Mode 3: the base station may configure a plurality of uplink reference signal resources, the uplink reference signal ports in each uplink reference signal resource may be capable of being used for the coherent transmission, and the uplink reference signal ports in parts of the uplink reference signal resources may also be capable of being used for the coherent transmission.

Mode 4: the base station may configure a plurality of uplink reference signal resources, parts of the uplink reference signal ports in one uplink reference signal resource and parts of the uplink reference signal ports in another uplink reference signal resource may be capable of being used for the coherent transmission.

Mode 5: the base station may configure a plurality of uplink reference signal resources divided into a plurality of resource groups, all the uplink reference signal resources in a same resource group may have the same quantity of uplink reference signal ports, and any two uplink reference signal resources in the same resource group may have a coherent transmission relationship among the uplink reference signal ports in the same uplink reference signal resource. In a possible embodiment of the present disclosure, any two uplink reference signal resources in the same resource group may not be used for the transmission of the uplink reference signal simultaneously.

Mode 6: the base station may configure a plurality of uplink reference signal resources divided into a plurality of resource groups, and any two resource groups may include a same configuration of the uplink reference signal resources and a same coherent transmission relationship among the uplink reference signal ports in the uplink reference signal resources in each resource group. In a possible embodiment of the present disclosure, any two resource groups may not be used for the transmission of the uplink reference signal simultaneously.

In a possible embodiment of the present disclosure, the base station may merely configure one uplink reference signal resource, and the UE and the base station may, by default, determine that the coherent transmission relationship among the uplink reference signal ports in the uplink reference signal resource configured by the base station corresponds to the coherent transmission capability reported by the UE. For instance, when a $(NK)^{th}$ antenna group capable of being used for the coherent transmission reported by the UE includes Mk antennas, first M1 uplink reference signal ports in the uplink reference signal resource configured by the base station may correspond to a first antenna group reported by the UE, . . . , and $$\left(\sum_{i=1}^{k-1} M_i + 1\right)^{th} \text{ to } \left(\sum_{i=1}^{k} M_i\right)^{th}$$

uplink reference signal ports in the uplink reference signal resource configured by the base station may correspond to a $k^{th}$ antenna group reported by the UE, and so on. This mode may be applied to a situation where one uplink reference signal resource corresponds to a plurality of antenna groups capable of being used for the coherent transmission. For example, the base station may configure two uplink reference signal resources, a first uplink reference signal resource may correspond to first X1 antenna groups capable of being used for the coherent transmission reported by the UE, and a second uplink reference signal resource may correspond to $(X1+1)^{th}$ to $(X2)^{th}$ antenna groups capable of being used for the coherent transmission reported by the UE. Upon the receipt of the configuration information about the uplink reference signal resources from the base station, the UE may determine the antennas for the transmission of each uplink reference signal resource in this default mode.

The above method may be easily applied to a situation where a plurality of uplink reference signal resources have been configured by the base station, e.g., a situation corresponding to the above methods 4 to 6, which will not be particularly defined herein. For example, the base station may configure a plurality of uplink reference signal resources, and the UE and the base station may, by default, determine the coherent transmission relationship among the uplink reference signal ports in each uplink reference signal resource configured by the base station corresponds to the coherent transmission capability reported by the UE. For instance, when the $(NK)^{th}$ antenna group capable of being used for the coherent transmission reported by the UE includes Mk antennas, first M1 uplink reference signal ports in each uplink reference signal resource configured by the base station may correspond to a first antenna group reported by the UE, . . . , and $$\left(\sum_{i=1}^{k-1} M_i + 1\right)^{th} \text{ to } \left(\sum_{i=1}^{k} M_i\right)^{th}$$

uplink reference signal ports in the uplink reference signal resource configured by the base station may correspond to a $k^{th}$ antenna group reported by the UE, and so on. Upon the receipt of the configuration information about the uplink reference signal resources from the base station, the UE may determine the antennas for the transmission of each uplink reference signal resource in this default mode.

In a possible embodiment of the present disclosure, when the configuration information about the one or more uplink reference signal resources includes the information about the quantity of the uplink reference signal ports in each uplink reference signal resource, the UE may determine the corresponding antennas s based on the quantity of the uplink reference signal ports in each uplink reference signal resource. The UE needs to ensure that the antennas s for the transmission of the uplink reference signals corresponding to one uplink reference signal resource are capable of being used for the coherent transmission. In a possible embodiment of the present disclosure, the antennas for the transmission of the uplink reference signals for the three uplink reference signal port groups may belong to different antenna groups capable of being used for the coherent transmission.

In a possible embodiment of the present disclosure, the uplink reference signals may be transmitted coherently on a same uplink reference signal resource through agreement.

In a possible embodiment of the present disclosure, the uplink reference signals may not be transmitted coherently on a same uplink reference signal resource through agreement.

In a possible embodiment of the present disclosure, the uplink reference signals may not be transmitted coherently on different uplink reference signal resources through agreement.

In some embodiments of the present disclosure, in a third implementation mode as shown in FIG. 1, the uplink transmission method may include the following steps.

Step 41: directly receiving the configuration information about the one or more uplink reference signal resources configured by the base station for the UE.

Step 42: transmitting the information about the coherent transmission relationship among the uplink reference signal ports in the one or more uplink reference signal resources configured by the base station for the UE. The information about the coherent transmission relationship may include information about the maximum or minimum quantity of the uplink reference signal ports capable of being used for the coherent transmission. The information about the coherent transmission relationship may include information indicating that at least parts of the uplink reference signal ports in a same uplink reference signal resource are capable of being used for the coherent transmission or information indicating that all the uplink reference signal ports are incapable of being used for the coherent transmission.

Step 43: determining the transmission antennas for the transmission of each uplink reference signal based on the coherent transmission relationship among the uplink reference signal ports indicated in the configuration information about the one or more uplink reference signal resources. The uplink reference signals corresponding to the uplink reference signal ports capable of being used for the coherent transmission may be transmitted through the antennas capable of being used for the coherent transmission.

Step 44: receiving, by the UE, the indication information about the uplink transmission from the base station, and determining the precoding matrix, the quantity of the transmission layers and the used antennas for the uplink transmission based on the indication information. The indication information may include the precoding matrix, the quantity of the transmission layers and the selected uplink reference signal resources for the uplink transmission. To be specific, the indication information about the uplink transmission may include the SRI, or the TPMI and the TRI, or the TPMI, the TRI and the SRI.

Figure 4:
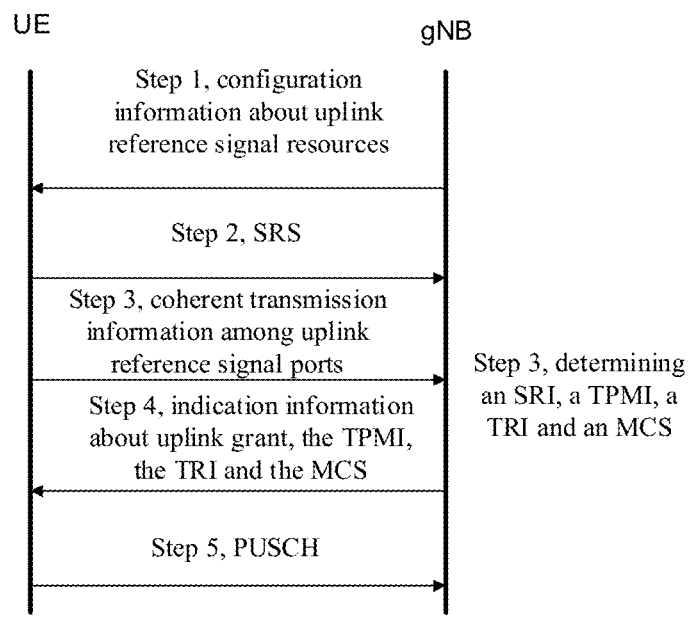
FIG. 4 is yet another schematic view showing the interaction procedure when a third implementation mode for the uplink transmission method in FIG. 1 is adopted.

To be specific, as shown in FIG. 4, the uplink transmission method may include the following steps.

Step 1: configuring, by the base station, the one or more uplink reference signal resources for the UE, and transmitting the configuration information about the one or more uplink reference signal resources to the UE.

Step 2: transmitting, by the UE, the one or more uplink reference signals on the one or more uplink reference signal resources configured by the base station.

In a possible embodiment of the present disclosure, the UE may further transmit the information about the coherent transmission relationship among the uplink reference signal ports to the base station.

Step 3: receiving, by the base station, the one or more uplink reference signals from the UE, and determining the precoding matrix, the quantity of the transmission layers and the selected uplink reference signal resources for the uplink transmission.

Step 4: transmitting, by the base station, the SRI, TMPI and TRI for the uplink transmission to the UE.

Step 5: determining, by the UE, the TPMI and the quantity of the data streams for the uplink transmission.

In Step 1, the base station may configure the one or more uplink reference signal resources for the UE and transmit the configuration information about the one or more uplink reference signal resources to the UE in the following modes.

Mode 1: the base station may configure one uplink reference signal resource for the UE, and the configuration information about the uplink reference signal resource may include the quantity of the uplink reference signal ports in the uplink reference signal resource. In a possible embodiment of the present disclosure, the quantity of the uplink reference signal ports may be smaller than or equal to the maximum quantity of the uplink reference signal ports supported by the UE, or the quantity of the antennas, or the quantity of the transmission antennas for the UE.

Mode 2: the base station may configure a plurality of uplink reference signal resources, and the configuration information about the plurality of uplink reference signal resources may include the quantity of the uplink reference signal resources and the quantity of the uplink reference signal ports in each uplink reference signal resource. In a possible embodiment of the present disclosure, the configuration information about the plurality of uplink reference signal resources may merely include the quantity of the uplink reference signal ports in one uplink reference signal resource, and the quantity of the uplink reference signal ports may be applied to all the uplink reference signal resources (this mode may be applied to beam management).

In a possible embodiment of the present disclosure, the quantity of the uplink reference signal ports in each uplink reference signal resource may be equal to the quantity of the antennas in one antennas panel supported by the UE (this mode may be applied to multi-panel transmission; of course, the quantity of the uplink reference signal ports may not be necessarily equal to the quantity of the antennas in the antenna panel, and it may also be smaller than the quantity of the antennas in the antenna panel).

Mode 3: the base station may configure a plurality of uplink reference signal resources, each uplink reference signal resource may include one uplink reference signal port, and the configuration information about the plurality of uplink reference signal resources may include the quantity of the uplink reference signal resources. In a possible embodiment of the present disclosure, merely this configuration may be adopted by the base station when the inter-antenna coherent transmission is not supported by the UE.

Mode 4: the base station may configure a plurality of uplink reference signal resource groups, and the configuration information about the uplink reference signal resources may include the quantity of the uplink reference signal resource groups, the quantity of the uplink reference signal resources in each uplink reference signal resource group and the quantity of the uplink reference signal ports in each uplink reference signal resource. In a possible embodiment of the present disclosure, the configuration information about the uplink reference signal resources may merely include the quantity of the uplink reference signal resource groups and the configuration information about the uplink reference signal resources in one uplink reference signal resource group, and the configuration information about the uplink reference signal resources in one uplink reference signal resource group may be applied to all the uplink reference signal resource groups.

In this step, in a possible embodiment of the present disclosure, the UE may report transmission capability information or antenna structure information. To be specific, the UE may report at least one or more of: information about the maximum quantity of antennas supported by the UE, or the quantity of the antennas; information indicating whether the UE supports the inter-antenna coherent transmission; information about the maximum quantity of antennas capable of being used for the coherent transmission supported by the UE; information about the quantity of antenna panels supported by the UE; and information about the quantity of antennas in each antenna panel supported by the UE.

When the maximum quantity of the antennas capable of being used for the coherent transmission supported by the UE is 1, it means that the UE does not support the inter-antenna coherent transmission.

In a possible embodiment of the present disclosure, the base station may determine the quantity of the uplink reference signal ports in the uplink reference signal resources based on the information reported by the UE.

In Step 2, the UE may transmit the one or more uplink reference signals based on the one or more uplink reference signal resources configured by the base station. In a possible embodiment of the present disclosure, the UE may transmit the information about the coherent transmission relationship among the uplink reference signal ports to the base station.

The UE may receive the configuration information about the one or more uplink reference signal resources from the base station, select the antennas corresponding to each uplink reference signal port, and transmit the one or more uplink reference signals through these antennas.

Due to different coherent transmission capabilities, different UEs may not necessarily perform the coherent transmission on all the uplink reference signal ports. Hence, in a possible embodiment of the present disclosure, the UE may transmit the information about the coherent transmission relationship among the uplink reference signal ports to the base station. The information about the coherent transmission relationship among the uplink reference signal ports transmitted by the UE to the base station may be used to indicate the uplink reference signal ports capable of being used for the coherent transmission and the uplink reference signal ports incapable of being used for the coherent transmission in the following methods.

Method 1: the base station may merely indicate the information about the coherent transmission relationship among the uplink reference signal port groups each including two or more uplink reference signal ports capable of being used for the coherent transmission, and the uplink reference signal port groups may be incapable of being used for the coherent transmission by default. Taking one uplink reference signal resource as an example, when the uplink reference signal resource includes four uplink reference signal ports, the UE may transmit first and second uplink reference signal ports through two antennas capable of being used for the coherent transmission, and the coherent transmission may not be performed among the antennas for the transmission of the other uplink reference signal ports and between the antennas for the transmission of the other uplink reference signal ports and the antennas S corresponding to the first and second uplink reference signal ports. The UE may indicate to the base station that the first and second uplink reference signal ports may be capable of being used for the coherent transmission. Upon the receipt of the indication information, the base station may consider that the first and second uplink reference signal ports form an uplink reference signal port group capable of being used for the coherent transmission, a third uplink reference signal port forms another uplink reference signal port group, and a fourth uplink reference signal port forms yet another uplink reference signal port group. The coherent transmission may not be performed among these uplink reference signal port groups. Upon the receipt of the uplink reference signal resources, the base station may merely select the uplink precoding matrix from the codewords corresponding to the coherent transmission relationship among the uplink reference signal ports when determining the TPMI and the TRI.

Method 2: the base station may indicate the coherent transmission relationship among all the uplink reference signal ports, e.g., the quantity of the uplink reference signal port groups, and the quantity of the uplink reference signal ports in each uplink reference signal port group. The base station and the UE may, through agreement, determine the uplink reference signal ports in a same uplink reference signal port group are capable of being used for the coherent transmission, and the uplink reference signal ports in different uplink reference signal port groups are incapable of being used for the coherent transmission. The base station may determine the coherent transmission relationship among the uplink reference signal ports based on the information about the coherent transmission relationship among the uplink reference signal ports indicated by the UE, so as to determine a limitation to a subset of the precoding matrices in the codebook (i.e., the precoding matrix may be merely selected from the codewords in the codebook corresponding to the coherent transmission relationship among the uplink reference signal ports).

Method 3: when the uplink reference signal ports capable of being used for the coherent transmission form one uplink reference signal port group, the base station and the UE may, through agreement, map the uplink reference signal port group consisting of more uplink reference signal ports capable of being used for the coherent transmission to smaller serial numbers of the uplink reference signal ports, and map the uplink reference signal port group consisting of fewer uplink reference signal ports to larger serial numbers of the uplink reference signal ports. In this way, when one uplink reference signal resource is configured by the base station, it is able to map the information about the coherent transmission relationship among the uplink reference signal ports through fewer bits. For example, when one uplink reference signal resource including four uplink reference signal ports have been configured by the base station, the coherent transmission relationships among the uplink reference signal ports may merely include (1,1,1,1), (2,1,1), (2,2), (3,1) and (4), which need to be indicated through three bits. (X1, X2, X3, X4) represents that there are four uplink reference signal port groups. A first group may include X1 uplink reference signal ports, a second group may include X2 uplink reference signal ports, . . . , the uplink reference signal ports in each group may be capable of being used for the coherent transmission, and the uplink reference signal ports in different groups may be incapable of being used for the coherent transmission. Fewer bits may be required on the basis of the transmission capability of the UE. For example, when the UE is capable of supporting at most two uplink reference signal ports for the coherent transmission, the coherent transmission relationships may merely include (1,1,1,1), (2,1,1) and (2,2), and at this time merely two bits may be required.

Method 4: the base station may configure a plurality of uplink reference signal resources, and the UE may indicate the coherent transmission relationship among the uplink reference signal ports in one uplink reference signal resource. This coherent transmission relationship may be applied to all the uplink reference signal resources. The coherent transmission relationship among the uplink reference signal ports in the uplink reference signal resource may be indicated in the above method 1, 2 or 3.

Method 5: the base station may configure a plurality of uplink reference signal resource groups, each uplink reference signal resource group may include one or more uplink reference signal resources, and the coherent transmission relationship among the uplink reference signal ports in one uplink reference signal resource may be indicated. This coherent transmission relationship may be applied to all the uplink reference signal resources in the uplink reference signal resource group including the uplink reference signal resource. The coherent transmission relationship among the uplink reference signal ports in the uplink reference signal resource may be indicated in the above method 1, 2 or 3.

Method 6: the base station may configure a plurality of uplink reference signal resource groups, and the UE may indicate the coherent transmission relationship among the uplink reference signal ports in one uplink reference signal resource group. This coherent transmission relationship may be applied to all the uplink reference signal resource groups. The coherent transmission relationship among the uplink reference signal ports in the uplink reference signal resource may be indicated in the above method 1, 2 or 3.

Method 7: the information about the coherent transmission relationship may include at least one of information indicating that all the uplink reference signal ports in one uplink reference signal resource are capable of being used for the coherent transmission, information indicating that all the uplink reference signal ports in one uplink reference signal resource are incapable of being used for the coherent transmission, and information indicating whether the plurality of uplink reference signal resources are capable of being used for the coherent transmission.

In a possible embodiment of the present disclosure, when the UE does not transmit any coherent transmission relationship among the uplink reference signal ports to the base station, the base station may consider that all the uplink reference signal ports in one uplink reference signal resource may be capable of being used for the coherent transmission.

In a possible embodiment of the present disclosure, when the UE does not transmit any coherent transmission relationship among the uplink reference signal ports to the base station, the base station may consider that all the uplink reference signal ports may be incapable of being used for the coherent transmission.

In a possible embodiment of the present disclosure, when the UE does not transmit any coherent transmission relationship among the uplink reference signal ports to the base station, the base station may consider that different uplink reference signal resources may be incapable of being used for the coherent transmission.

In Step 3, the base station may receive the one or more uplink reference signals from the UE, and determine the precoding matrix, the quantity of the transmission layers and the selected uplink reference signal resources for the uplink transmission.

The base station may receive the one or more uplink reference signals from the UE, and determine the quantity of layers, the precoding matrix and the uplink reference signal resources for the uplink transmission based on a certain rule. The rule may be a rule of maximum RSRP, a rule of maximum throughput, or a rule with an inter-user interference is taken into consideration.

When the base station merely configures one uplink reference signal resource for the UE, it is unnecessary to select the uplink reference signal resource.

When each uplink reference signal resource configured by the base station for the UE merely includes one uplink reference signal port, it is merely necessary to select the SRI, without any necessity to select the precoding matrix. At this time, the quantity of transmission layers may be equal to the quantity of the selected uplink reference signal resources.

In a possible embodiment of the present disclosure, the base station may receive the information about the coherent transmission relationship among the uplink reference signal ports from the UE, and determine the quantity of layers, the precoding matrix and the uplink reference signal resources for the uplink transmission based on the information about the coherent transmission relationship. To be specific, when selecting the precoding matrix, the base station may merely select the precoding matrix based on the information about the coherent transmission relationship among the uplink reference signal ports from the UE, but may not select the precoding matrix beyond the range of the information about the coherent transmission relationship. For example, the uplink reference signal resource configured by the base station may include four uplink reference signal ports, and the UE may indicate that merely first and second uplink reference signal ports are capable of being used for the coherent transmission. During the selection of the precoding matrix, the base station may merely select the precoding matrix from precoding matrices in each of which the total quantity of uplink reference signal ports is 4 and merely the first and second uplink reference signals are capable of being used for the coherent transmission. Candidate precoding matrices may include precoding matrices in each of which the first and second uplink reference signal ports are incapable of being used for the coherent transmission. The precoding matrix in which two uplink reference signal ports are capable of being used for the coherent transmission may refer to a precoding matrix in which the two uplink reference signal ports have non-zero values corresponding to at least one layer, i.e., the two uplink reference signal ports may be used for the transmission of data in a same layer simultaneously.

In a possible embodiment of the present disclosure, the base station may select the precoding matrix for each uplink reference signal resource.

In a possible embodiment of the present disclosure, the base station may implement an ergodic process of a set of all possible combinations of simultaneously-transmitted uplink reference signal resources, so as to select the optimum precoding matrix. The combination of the simultaneously-transmitted uplink reference signal resources may refer to a combination in which one or more uplink reference signal resources are transmitted simultaneously. For example, when the base station has configured three uplink reference signal resources, the set of all possible combinations of the simultaneously-transmitted uplink reference signal resources may include {merely a first uplink reference signal resource is used for the transmission of the uplink reference signal, merely a second uplink reference signal resource is used for the transmission of the uplink reference signal, merely a third uplink reference signal resource is used for the transmission of the uplink reference signal, the first and second uplink reference signal resources are used for the transmission of the uplink reference signal, the first and third uplink reference signal resources are used for the transmission of the uplink reference signal, the second and third uplink reference signal resources are used for the transmission of the uplink reference signal, and the first, second and third uplink reference signal resources are used for the transmission of the uplink reference signal}. To be specific, the base station may select the precoding matrix from a codebook corresponding to the total quantity of the uplink reference signal ports in all the simultaneously-transmitted uplink reference signal resources or from a codebook corresponding to each uplink reference signal resource, and the precoding matrices corresponding to the uplink reference signal resources may form a precoding matrix after the transformation of weight values.

In a possible embodiment of the present disclosure, the base station may implement an ergodic process of a set of all possible combinations of simultaneously-transmitted uplink reference signal resources in each of the uplink reference signal resource groups, so as to select one uplink reference signal resource group, the uplink reference signal resources corresponding to the group, the precoding matrix and the quantity of transmission layers.

In a possible embodiment of the present disclosure, the base station may implement an ergodic process of a set of combinations of simultaneously-transmitted uplink reference signal resources corresponding to at most one uplink reference signal resource selected from each uplink reference signal resource group, so as to select the optimum precoding matrix.

In Step 4, the base station may transmit the indication information including the SRI, TPMI and TRI for the uplink transmission to the UE.

When merely one uplink reference signal resource has been configured by the base station for the UE, the indication information does not need to include the SRI.

When a plurality of uplink reference signal resources have been configured by the base station for the UE, the indication information needs to include the SRI. SRI may be used to indicate merely one uplink reference signal resource, or a plurality of uplink reference signal resources.

When a plurality of uplink reference signal resources has been configured by the base station for the UE and each uplink reference signal resource merely includes one uplink reference signal port, the indication information may merely include the SRI rather than the TPMI and the TRI. The quantity of the uplink reference signal resources corresponding to the SRI may be equal to the quantity of data layers.

The SRI may be encoded independently, e.g., in the form of bitmap, i.e., one bit may correspond to one uplink reference signal resource, one state of each bit represents that the uplink reference signal resource has been selected and another state represents that the uplink reference signal resource has not been selected. For example, when four uplink reference signal resources have been configured by the base station, four bits may be used to indicate the uplink reference signal resources. A state 1 of each bit represents that the uplink reference signal resource has been selected, a state 0 represents that the uplink reference signal resource has not been selected. 1101 represents that first, second and fourth uplink reference signal resources have been selected. The SRI may also be encoded in a joint manner, i.e., all the combinations of the uplink reference signal resources may be traversed so as to encode the SRI in a joint manner. When four uplink reference signal resources have been configured by the base station, there may exist possibilities if k uplink reference signal resources are selected, the total quantity of possibilities may be $$\sum_{k=1}^{4} C_4^k,$$

so the SRI may be encoded using $$\left\lceil \log \sum_{k=1}^{4} C_4^k \right\rceil$$

bits. When a plurality of uplink reference signal resource groups has been configured by the base station and the UE is merely capable of at most transmitting the uplink reference signals on one uplink reference signal resource in one uplink reference signal resource group and the uplink reference signal resources in the other uplink reference signal resource groups, the quantity of the combinations of the selected uplink reference signal resources may be smaller than the quantity of the combinations of the traversed uplink reference signal resource groups.

For simplicity, the following description will be given when the SRI indicates one uplink reference signal resource. Of course, the SRI may indicate each of a plurality of uplink reference signal resources, or indicate a plurality of uplink reference signal resources in a joint manner.

The TPMI and the TRI may each be encoded independently or jointly. When they are encoded independently, the DCI may include a dedicated region for indicating the TRI, and another dedicated region for indicating the TPMI.

In a possible embodiment of the present disclosure, the quantity of encoding states of the TPMI may be determined based on the TRI, i.e., the TPMI may be indicated merely after all codewords corresponding to the TRI are renumbered. For example, when one uplink reference signal resource includes four uplink reference signal ports, a codebook of the four uplink reference signal ports may include T1, T2, T3 or T4 codewords when TRI=1, 2, 3 or 4. When TRI=m, the uplink precoding matrices may merely exist in all the codewords for TRI=m, and one encoding state of the TPMI may correspond to one codeword when TRI=m. In one mode, the quantity of the encoding bits of the TPMI may be determined based on the TRI, e.g., the TPMI may be encoded through Long™ bits. In another mode, the quantity of the encoding bits of the TPMI may be determined based on the maximum one of the quantities of codewords corresponding to the possible TRIs, e.g., the TPMI may be encoded through max log(Tm) bits. When the quantity of the states corresponding to the quantity of the encoding bits is greater than the quantity of the codewords when TRI=m, the remaining states may be reserved states.

In a possible embodiment of the present disclosure, for Step 5, the base station may determine a searching range of the precoding matrices based on the information about the coherent transmission relationship among the uplink reference signal ports. The quantity of the encoding states of the TPMI may be determined based on the TRI and the information about the coherent transmission relationship among the uplink reference signal ports. The quantity of the encoding states of the TPMI may correspond to the TRI as well as the quantity of the precoding matrices for the coherent transmission relationship among the uplink reference signal ports. In one mode, the quantity of the encoding bits of the TPMI may be determined based on the TRI and the information about the coherent transmission relationship among the uplink reference signal ports, e.g., when TRI=m and the quantity of the precoding matrices for the coherent transmission relationship among the uplink reference signal ports is Sm, the TPMI may be encoded through log(Sm) bits. In another mode, the quantity of the encoding bits of the TPMI may be determined based on the maximum one of the quantities of the codewords corresponding to the possible TRIs for the information about the coherent transmission relationship among the uplink reference signal ports, e.g., the TPMI may be encoded through max log(Sm) bits. When the quantity of the states corresponding to the quantity of the encoding bits is greater than the quantity of the codewords when TRI=m, the remaining states may be reserved states.

The quantity of encoding bits of the independently-encoded TRI may be determined based on all possible values of the TRI. In one mode, all the possible values of the TRI may be determined based on the quantity of the uplink reference signal ports in the uplink reference signal resources. For example, all the possible values of the TRI may be positive integers each smaller than or equal to the quantity of the uplink reference signal ports in the uplink reference signal resources. In another mode, all the possible values of the TRI may be determined based on the quantity of the uplink reference signal ports in the uplink reference signal resources and the maximum quantity of transmission layers supported by the UE, i.e., all the possible values of the TRI may be positive integers each smaller than or equal to a minimum value of the quantity of the uplink reference signal ports in the uplink reference signal resources and the maximum quantity of transmission layers supported by the UE.

The TPMI and the TRI may be indicated through joint encoding.

When the TPMI and the TRI are encoded jointly, the total quantity of active encoding states may be a sum of the quantities of all possible precoding matrices corresponding to all the TRIs. When the quantity of the states corresponding to the quantity of the encoding bits is greater than the quantity of the active encoding states, the remaining states may be reserved states.

In a possible embodiment of the present disclosure, for Step 5, the base station may determine the searching range of the precoding matrices based on the information about the coherent transmission relationship among the uplink reference signal ports. The quantity of active encoding states of the TPMI and the TRI which are encoded jointly may be equal to a sum of the quantities of the precoding matrices for the coherent transmission relationship among the uplink reference signal ports corresponding to all possible values of the TRI. When the quantity of the states corresponding to the quantity of the encoding bits is greater than the quantity of the active encoding states, the remaining states may be reserved states.

The SRI, the TPMI and the TRI may also be indicated through joint encoding. The total quantity of active encoding states may be a sum of the quantities of all possible precoding matrices corresponding to all the TRIs corresponding to all the uplink reference signal resources, or a sum of the quantities of all possible precoding matrices corresponding to all the TRIs corresponding to the set of all possible combinations of the simultaneously-transmitted uplink reference signal resources. When the quantity of the states corresponding to the quantity of the encoding bits is greater than the quantity of the active encoding states, the remaining states may be reserved states.

In a possible embodiment of the present disclosure, the base station may indicate the TPMI and the TRI separately for each selected uplink reference signal resource.

In a possible embodiment of the present disclosure, the base station may indicate the TPMI and the TRI jointly for each selected uplink reference signal resource.

In a possible embodiment of the present disclosure, the base station may indicate each uplink reference signal resource group, and the indication information may be encoded independently, or jointly with the other information.

In this step, the TPMI, the TRI, the SRI and the encoding mode of the uplink reference signal resource groups need to be agreed in advance between the base station and the UE.

In Step 5, the UE may determine the TPMI and the quantity of the data streams for the uplink transmission.

The UE may receive the indication information indicating the SRI, or the TPMI and the TRI, or the TPMI, the TRI and the SRI from the base station. In a possible embodiment of the present disclosure, the UE may receive the indication information about the uplink reference signal resource groups, and determine the precoding matrix, the quantity of the transmission layers and the used antennas for the uplink transmission.

The antennas for the uplink transmission may use the uplink reference signal ports corresponding to the uplink reference signal resources indicated by the base station, and the precoding matrix for each uplink reference signal port may be determined based on the TPMI.

A transmission and reception scheme for interaction information about the coherent transmission capability on the transmission chain between the UE and the base station as well as an interaction scheme for such signaling as resource configuration and uplink access grant have been given in the above embodiments, so it is able for the base station and the UE to have a same hypothesis on the coherent transmission relationship among the uplink reference signal ports in the uplink reference signal resources, thereby to ensure the uplink transmission performance.

Figure 5:
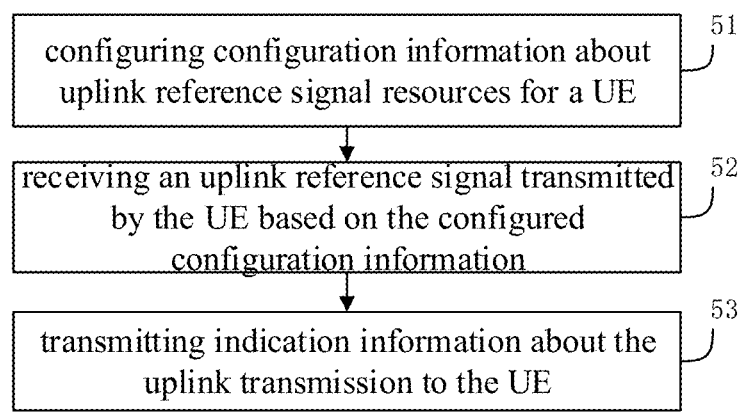
FIG. 5 is a flow chart of an uplink transmission configuration method applied for a base station according to one embodiment of the present disclosure.

The present disclosure further provides in some embodiments an uplink transmission configuration method which, as shown in FIG. 5, includes: Step 51 of configuring configuration information about one or more uplink reference signal resources for a UE; Step 52 of receiving one or more uplink reference signals transmitted by the UE based on the configured configuration information; and Step 53 of transmitting indication information about the uplink transmission to the UE.

Prior to Step 52, the uplink transmission configuration method may further include receiving coherent transmission capability information about the UE from the UE.

Step 51 may include determining the configuration information about the one or more uplink reference signal resources based on the coherent transmission capability information reported by the UE.

Prior to Step 52, the uplink transmission configuration method may further include transmitting information about a coherent transmission relationship among the uplink reference signal ports in the one or more uplink reference signal resources to the UE.

In a possible embodiment of the present disclosure, the information about the coherent transmission relationship may be information about the coherent transmission relationship among the uplink reference signal ports in each uplink reference signal resource.

In a possible embodiment of the present disclosure, the information about the coherent transmission relationship may be included in the configuration information about the one or more uplink reference signal resource, or the coherent transmission relationship information may be information indicated separately.

In a possible embodiment of the present disclosure, the information about the coherent transmission relationship may be determined based on the coherent transmission capability information.

In a possible embodiment of the present disclosure, the indication information about the uplink transmission and contents indicated by the indication information may be determined based on the coherent transmission relationship and the one or more uplink reference signals received by the base station.

In a possible embodiment of the present disclosure, the coherent transmission capability information about the may be is a coherent transmission capability of antennas supported by the UE.

In a possible embodiment of the present disclosure, the antennas may include physical antennas, transmission chains, TXRUs or uplink reference signal ports.

In a possible embodiment of the present disclosure, the coherent transmission capability information about the UE may include antenna group information, antennas in each antenna group are capable of being used for coherent transmission, and antennas in different antenna groups may be incapable of being used for coherent transmission.

In a possible embodiment of the present disclosure, the coherent transmission capability information about the UE may further include information about the total quantity of antennas.

In a possible embodiment of the present disclosure, the information about the coherent transmission relationship may include uplink reference signal port group information, uplink reference signal ports in each uplink reference signal port group may be capable of being used for the coherent transmission, and uplink reference signal ports in different uplink reference signal port groups may be incapable of being used for the coherent transmission.

In a possible embodiment of the present disclosure, the information about the coherent transmission relationship may include information about the maximum quantity of uplink reference signal ports capable of being used for the coherent transmission or the minimum quantity of uplink reference signal ports capable of being used for the coherent transmission.

In a possible embodiment of the present disclosure, the information about the coherent transmission relationship may include information indicating that at least parts of the uplink reference signal ports in a same uplink reference signal resource are capable of being used for the coherent transmission or information indicating that all the uplink reference signal ports in the same uplink reference signal resource are incapable of being used for the coherent transmission.

In a possible embodiment of the present disclosure, the uplink reference signal port group information in the information about the coherent transmission relationship may include: 1) information indicating that merely parts of the uplink reference signal ports in at least one uplink reference signal resource are capable of being used for the coherent transmission when the configuration information about the one or more uplink reference signal resources includes one or more uplink reference signal resources; or 2) information indicating that all the uplink reference signal ports in each uplink reference signal resource are capable of being used for the coherent transmission and the uplink reference signal ports in different uplink reference signal resources are incapable of being used for the coherent transmission when the configuration information about the one or more uplink reference signal resources includes a plurality of uplink reference signal resources; or 3) information indicating that the uplink reference signal ports in each uplink reference signal resource are capable of being used for the coherent transmission and the uplink reference signal ports in parts of the uplink reference signal resources are capable of being used for the coherent transmission when the configuration information about the one or more uplink reference signal resources includes a plurality of uplink reference signal resources; or 4) information indicating that parts of the uplink reference signal ports in one uplink reference signal resource and parts of the uplink reference signal ports in another uplink reference signal resource are capable of being used for the coherent transmission when the configuration information about the one or more uplink reference signal resources includes a plurality of uplink reference signal resources; or 5) information indicating that any two uplink reference signal resources in a same resource group are incapable of being used for the transmission of the one or more uplink reference signals simultaneously and any two uplink reference signal resources in the same resource group has the same coherent transmission relationship among the uplink reference signal ports in the uplink reference signal resource when the configuration information about the one or more uplink reference signal resources includes a plurality of uplink reference signal resources which is divided into a plurality of resource groups and all the uplink reference signal resources in a same resource group have the same quantity of uplink reference signal ports; or 6) information indicating that any two resource groups include the same quantity of uplink reference signal resources, the same coherent transmission relationship among the uplink reference signal ports in the resource group and the uplink reference signal resources are incapable of being used for the transmission of the one or more uplink reference signals simultaneously when the configuration information about the one or more uplink reference signal resources includes a plurality of uplink reference signal resources which is divided into a plurality of resource groups.

In a possible embodiment of the present disclosure, the configuration information may include the quantity of the uplink reference signal resources and the quantity of the uplink reference signal ports in each uplink reference signal resource.

In a possible embodiment of the present disclosure, the information about the coherent transmission relationship may include: 11) a coherent transmission relationship among the uplink reference signal ports in one uplink reference signal resource and applied to all the uplink reference signal resources when the configuration information about the one or more uplink reference signal resources includes a plurality of uplink reference signal resources; 15) a coherent transmission relationship among the uplink reference signal ports in one uplink reference signal resource and applied to all the uplink reference signal resources in an uplink reference signal resource group to which the uplink reference signal resource belongs when the configuration information about the one or more uplink reference signal resources includes a plurality of uplink reference signal resource groups each including one or more uplink reference signal resources; or 16) a coherent transmission relationship among the uplink reference signal ports in one uplink reference signal resource groups and applied to all the uplink reference signal resource groups when the configuration information about the one or more uplink reference signal resources includes a plurality of uplink reference signal resource groups.

In a possible embodiment of the present disclosure, the information about the coherent transmission relationship may be a mapping between the uplink reference signal ports and the antenna groups, or a mapping between the uplink reference signal resources and the antenna groups.

In a possible embodiment of the present disclosure, prior to receiving the one or more uplink reference signals transmitted by the UE based on the configured configuration information, the uplink transmission configuration method may further include determining a coherent transmission relationship among the uplink reference signal ports in the one or more uplink reference signal resources configured for the UE based on the coherent transmission capability of the UE and the configuration information about the one or more uplink reference signal resources, and a mapping between the coherent transmission relationship and the coherent transmission capability of the UE is predefined. The transmitting the one or more uplink reference signals based on the configuration information about the one or more uplink reference signal resources may include determining antennas for the transmission of the one or more uplink reference signals based on the coherent transmission relationship, and the one or more uplink reference signals may be transmitted on the uplink reference signal ports capable of being used for the coherent transmission through the antennas capable of being used for the coherent transmission.

Step 51 may further include directly transmitting the configuration information about the one or more uplink reference signal resources to the UE.

Prior to Step 52, the uplink transmission configuration method may further include receiving the information about the coherent transmission relationship among the uplink reference signal ports from the UE.

In a possible embodiment of the present disclosure, the information about the coherent transmission relationship may include uplink reference signal port group information, the uplink reference signal ports in each uplink reference signal port group may be capable of being used for the coherent transmission, and the uplink reference signal ports in different uplink reference signal port groups may be incapable of being used for the coherent transmission.

In Step 53, the indication information about the uplink transmission may include an SRI, or a TPMI and a TRI, or the TPMI, the TRI and the SRI. The indication information about the uplink transmission may be determined based on the coherent transmission relationship.

The uplink transmission configuration method may be applied to the base station and correspond to the above-mentioned uplink transmission method for the UE in FIGS. 1 to 4. The implementations involving the base station in FIGS. 1 to 4 may also be applied to the uplink transmission configuration method with a same technical effect.

The present disclosure further provides in some embodiments a UE, which includes: an acquisition module configured to acquire configuration information about one or more uplink reference signal resources configured by a base station for the UE; a transmission module configured to transmit one or more uplink reference signals based on the configuration information about the one or more uplink reference signal resources; and a reception module configured to receive indication information about uplink transmission determined by the base station. The transmission module is further configured to perform the uplink transmission based on the indication information.

In a possible embodiment of the present disclosure, the transmission module is further configured to transmit coherent transmission capability information about the UE to the base station.

In a possible embodiment of the present disclosure, the reception module is further configured to receive the configuration information about the one or more uplink reference signal resources determined by the base station based on the coherent transmission capability information about the UE.

In a possible embodiment of the present disclosure, the reception module is further configured to receive information about a coherent transmission relationship among uplink reference signal ports in the one or more uplink reference signal resources from the base station.

In a possible embodiment of the present disclosure, the transmission module is further configured to determine a transmission antenna corresponding to each uplink reference signal port included in the configuration information about the one or more uplink reference signal resources based on the configuration information about the one or more uplink reference signal resources and the information about the coherent transmission relationship, and transmit the one or more uplink reference signals through the transmission antenna.

In a possible embodiment of the present disclosure, a mapping between the coherent transmission relationship among the uplink reference signal ports in the one or more uplink reference signal resources configured by the base station for the UE and the coherent transmission capability of the UE may be predefined.

In a possible embodiment of the present disclosure, the transmission module is further configured to determine the coherent transmission relationship among the uplink reference signal ports in each uplink reference signal resource configured by the base station for the UE based on the coherent transmission capability of the UE and the configuration information about the one or more uplink reference signal resources, and a mapping between the coherent transmission relationship and the coherent transmission capability of the UE is predefined. The transmission module is further configured to determine antennas for the transmission of the one or more uplink reference signals based on the coherent transmission relationship, and the one or more uplink reference signals are transmitted on the uplink reference signal ports capable of being used for the coherent transmission through the antennas capable of being used for the coherent transmission.

In a possible embodiment of the present disclosure, the transmission module is further configured to transmit, to the base station, the information about the coherent transmission relationship among the uplink reference signal ports in the one or more uplink reference signal resources configured by the base station for the UE.

In a possible embodiment of the present disclosure, the transmission module is further configured to determine transmission antennas for the transmission of each uplink reference signal based on the coherent transmission relationship, and each uplink reference signal may be transmitted on the uplink reference signal ports capable of being used for the coherent transmission through the transmission antennas capable of being used for the coherent transmission.

In a possible embodiment of the present disclosure, the reception module is further configured to: determine a precoding matrix, the quantity of transmission layers and the antennas to be used for the uplink transmission based on the indication information; or determine the precoding matrix, the quantity of transmission layers and the antennas to be used for the uplink transmission based on the indication information and the coherent transmission relationship. The indication information about the uplink transmission may include an SRI, or a TPMI and a TRI, or the TPMI, the TRI and the SRI.

The UE may be used to implement the above-mentioned uplink transmission method in FIGS. 1 to 4, and the implementation of the UE may refer to that of the uplink transmission method in FIGS. 1 to 4 with a same technical effect.

The present disclosure further provides in some embodiments a UE, which includes a transceiver, a memory, a processor, and a computer program stored in the memory and executed by the processor. The processor is configured to read the computer program in the memory, so as to control the transceiver to: acquire configuration information about one or more uplink reference signal resources configured by a base station for the UE; transmit one or more uplink reference signals based on the configuration information about the one or more uplink reference signal resources; receive indication information about uplink transmission determined by the base station; and perform the uplink transmission based on the indication information.

Figure 6:
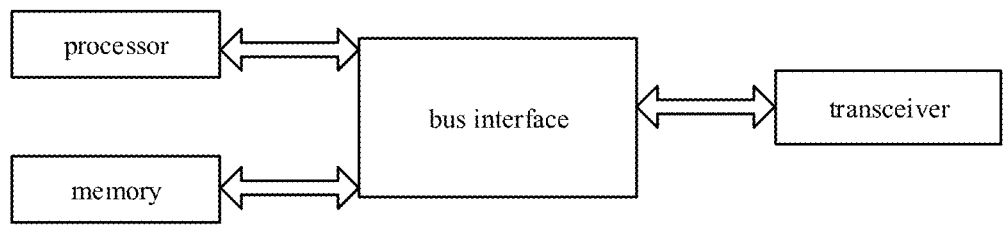
FIG. 6 is a schematic view showing hardware devices for the UE or the base station according to one embodiment of the present disclosure.

As shown in FIG. 6, bus architecture may include a number of buses and bridges connected to each other, so as to connect various circuits for one or more processors and one or more memories. In addition, as is known in the art, the bus architecture may be used to connect any other circuits, such as a circuit for a peripheral device, a circuit for a voltage stabilizer and a power management circuit. A bus interface may be provided, and the transceiver may consist of a plurality of elements, i.e., a transmitter and a receiver for communication with any other devices over a transmission medium. The processor may take charge of managing the bus architecture as well as general processings. The memory may store therein data for the operation of the processor.

The present disclosure further provides in some embodiments a base station, which includes: a configuration module configured to configure configuration information about one or more uplink reference signal resources for a UE; a reception module configured to receive one or more uplink reference signals transmitted by the UE based on the configured configuration information; and a transmission module configured to transmit indication information about the uplink transmission to the UE.

In a possible embodiment of the present disclosure, the reception module is further configured to receive coherent transmission capability information about the UE from the UE.

In a possible embodiment of the present disclosure, the configuration module is further configured to determine the configuration information about the one or more uplink reference signal resources based on the coherent transmission capability information reported by the UE.

In a possible embodiment of the present disclosure, the transmission module is further configured to transmit information about a coherent transmission relationship among the uplink reference signal ports in the one or more uplink reference signal resources to the UE.

In a possible embodiment of the present disclosure, a mapping between the coherent transmission relationship and the coherent transmission capability of the UE may be predefined.

In a possible embodiment of the present disclosure, the transmission module is further configured to directly transmit the configuration information about the one or more uplink reference signal resources to the UE.

In a possible embodiment of the present disclosure, the reception module is further configured to receive the information about the coherent transmission relationship among the uplink reference signal ports from the UE.

In a possible embodiment of the present disclosure, the transmission module is further configured to transmit the indication information about the uplink transmission determined based on the one or more uplink reference signals to the UE, and the indication information about the uplink transmission may include an SRI, or a TPMI and a TRI, or the TPMI, the TRI and the SRI.

In a possible embodiment of the present disclosure, the transmission module is further configured to determine the indication information about the uplink transmission based on the coherent transmission relationship.

The base station may also be used to implement the procedures involving the base station in the above-mentioned uplink transmission method in FIGS. 1 to 4, and the implementation of the base station may refer to that of the uplink transmission method in FIGS. 1 to 4 with a same technical effect.

The present disclosure further provides in some embodiments a base station, which includes a transceiver, a memory, a processor, and a computer program stored in the memory and executed by the processor. The processor is configured to read the computer program stored in the memory, so as to control the transceiver to: configure configuration information about one or more uplink reference signal resources for a UE; receive one or more uplink reference signals transmitted by the UE based on the configured configuration information; and transmit indication information about the uplink transmission to the UE.

As shown in FIG. 6, bus architecture may include a number of buses and bridges connected to each other, so as to connect various circuits for one or more processors and one or more memories. In addition, as is known in the art, the bus architecture may be used to connect any other circuits, such as a circuit for a peripheral device, a circuit for a voltage stabilizer and a power management circuit. A bus interface may be provided, and the transceiver may consist of a plurality of elements, i.e., a transmitter and a receiver for communication with any other devices over a transmission medium. The processor may take charge of managing the bus architecture as well as general processings. The memory may store therein data for the operation of the processor.

The present disclosure further provides in some embodiments a computer-readable storage medium storing therein a computer program. The computer program is executed by a processor so as to implement the above-mentioned methods.

In a possible embodiment of the present disclosure, one antenna for the UE may correspond to one uplink reference signal port. Based on the hypothesis that one antenna corresponds to one uplink reference signal port, the base station may determine the coherent transmission relationship among the uplink reference signal ports based on the coherent transmission capability information about the UE. In addition, based on the hypothesis that one antenna corresponds to one uplink reference signal port, the base station may determine the configuration information about the one or more uplink reference signal resources based on the coherent transmission capability information about the UE. Furthermore, based on the hypothesis that one antenna corresponds to one uplink reference signal port, the coherent transmission capability information about the UE and the coherent transmission relationship among the uplink reference signal ports may be pre-agreed.

It should be appreciated that, the UE in the embodiments of the present disclosure may be that mentioned in the method embodiments, and the implementation of the UE may refer to that of the uplink transmission method mentioned hereinabove with a same beneficial effect, which will thus not be particularly defined herein.

Devices involved in the embodiments of the present disclosure may include a transmission device (e.g., the base station) and a reception device (i.e., the UE), and the downlink transmission and the uplink transmission may be performed between the transmission device and the reception device which accesses to the transmission device.

The base station may be, but not limited to, a known base station or a transmission point device of any other type, and the UE may be, but not limited to, a user terminal. For example, the base station may be a terminal capable of performing a configuration operation on the other terminals. In addition, the base station may include a plurality of network nodes. The network node may merely include a Radio Frequency (RF) unit (e.g., A Remote Radio Unit (RRU)), or both a baseband and a RF unit (e.g., an active antenna), or merely a baseband (e.g., a Baseband Unit (BBU)); or it may not include any digital/RF functions at an air interface layer, and instead it may merely take charge of high-layer signaling processing (at this time, the baseband processing operation at the air interface layer may be performed by the active antenna). Of course, the network node may also be implemented in any other possible modes.

The UE, also as called as user terminal, terminal, Mobile Station (MS) or mobile terminal, may communicate with one or more core networks via a Radio Access Network (RAN). For example, the UE may be a mobile telephone (or cellular phone), a computer having the mobile terminal (e.g., a portable, pocket-size, handheld, built-in or vehicle-mounted mobile terminal) capable of exchanging voice and/or data with the RAN), a Device to Device (D2D) terminal, or a Machine to Machine (M2M) terminal. The types of the network devices and the UE will not be particularly defined herein.

In the embodiments of the present disclosure, the involved precoding matrix may include one precoding matrix or vector, or include a plurality of precoding vectors, or include one beam, or include a plurality of beams. The quantity of the beams and precoding matrices will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An uplink transmission method, performed by User Equipment (UE), comprising:
    transmitting coherent transmission capability information about the UE to a base station;
    acquiring configuration information about one or more uplink reference signal resources configured by the base station for the UE;
    transmitting one or more uplink reference signals based on the configuration information about the one or more uplink reference signal resources;
    receiving indication information about uplink transmission determined by the base station; wherein the indication information about the uplink transmission comprises a Transmission Precoding Matrix Indicator (TPMI) and a Transmission Rank Indicator (TRI), the TPMI and the TRI are encoded jointly, and a quantity of active encoding states of the TPMI and the TRI which are encoded jointly is equal to a sum of quantities of the precoding matrices for a coherent transmission relationship among the uplink reference signal ports corresponding to all possible values of the TRI; or a total quantity of active encoding states is a sum of the quantities of all possible precoding matrices corresponding to all TRIS; and performing the uplink transmission based on the indication information.

2. The uplink transmission method according to claim 1, wherein the acquiring the configuration information about the one or more uplink reference signal resources configured by the base station for the UE comprises:

receiving the configuration information about the one or more uplink reference signal resources determined by the base station based on the coherent transmission capability information about the UE.

3. The uplink transmission method according to claim 1, wherein prior to transmitting the one or more uplink reference signals based on the configuration information about the one or more uplink reference signal resources, the uplink transmission method further comprises: receiving information about the coherent transmission relationship among uplink reference signal ports in the one or more uplink reference signal resources from the base station.

4. The uplink transmission method according to claim 3, wherein the transmitting the one or more uplink reference signals based on the configuration information about the one or more uplink reference signal resources comprises:

determining a transmission antenna corresponding to each uplink reference signal port comprised in the configuration information about the one or more uplink reference signal resources based on the configuration information about the one or more uplink reference signal resources and the information about the coherent transmission relationship, and transmitting the one or more uplink reference signals through the transmission antenna; or wherein the information about the coherent transmission relationship is information about the coherent transmission relationship among the uplink reference signal ports in each uplink reference signal resource; or wherein the information about the coherent transmission relationship is comprised in the configuration information about the one or more uplink reference signal resource, or the coherent transmission relationship information is information indicated separately; or wherein the information about the coherent transmission relationship is determined based on the coherent transmission capability information; or wherein the indication information about the uplink transmission and contents indicated by the indication information are determined based on the coherent transmission relationship and the one or more uplink reference signals received by the base station; or wherein a mapping between the coherent transmission relationship among the uplink reference signal ports in the one or more uplink reference signal resources configured by the base station for the UE and the coherent transmission capability of the UE is predefined; or wherein the information about the coherent transmission relationship comprises information about a maximum quantity of uplink reference signal ports capable of being used for the coherent transmission or a minimum quantity of uplink reference signal ports capable of being used for the coherent transmission; or wherein the receiving the indication information about the uplink transmission determined by the base station and performing the uplink transmission comprises: determining the precoding matrix, the quantity of transmission layers and the antennas to be used for the uplink transmission based on the indication information and the coherent transmission relationship.

5. The uplink transmission method according to claim 1, wherein the coherent transmission capability information about the UE is a coherent transmission capability of antennas supported by the UE, wherein the antennas comprise physical antennas, transmission chains, transmission and reception units (TXRUs) or uplink reference signal ports.

6. The uplink transmission method according to claim 1, wherein the coherent transmission capability information about the UE comprises antenna group information, antennas in each antenna group are capable of being used for coherent transmission, and antennas in different antenna groups are incapable of being used for coherent transmission.

7. The uplink transmission method according to claim 1, wherein the coherent transmission capability information about the UE comprises information indicating that at least parts of antennas are capable of being used for the coherent transmission or information indicating that all the antennas are incapable of being used for the coherent transmission; or wherein the coherent transmission capability information about the UE comprises information about a maximum quantity of antennas capable of being used for the coherent transmission or a minimum quantity of antennas capable of being used for the coherent transmission.

8. The uplink transmission method according to claim 3, wherein the information about the coherent transmission relationship comprises uplink reference signal port group information, uplink reference signal ports in each uplink reference signal port group are capable of being used for the coherent transmission, and uplink reference signal ports in different uplink reference signal port groups are incapable of being used for the coherent transmission.

9. The uplink transmission method according to claim 3, wherein the information about the coherent transmission relationship comprises information indicating that at least parts of the uplink reference signal ports in a same uplink reference signal resource are capable of being used for the coherent transmission or information indicating that all the uplink reference signal ports in the same uplink reference signal resource are incapable of being used for the coherent transmission.

10. The uplink transmission method according to claim 1, wherein prior to transmitting the one or more uplink reference signals based on the configuration information about the one or more uplink reference signal resources, the uplink transmission method further comprises:

determining the coherent transmission relationship among the uplink reference signal ports in each uplink reference signal resource configured by the base station for the UE based on the coherent transmission capability of the UE and the configuration information about the one or more uplink reference signal resources, and a mapping between the coherent transmission relationship and the coherent transmission capability of the UE is predefined, wherein the transmitting the one or more uplink reference signals based on the configuration information about the one or more uplink reference signal resources comprises:

determining antennas for the transmission of the one or more uplink reference signals based on the coherent transmission relationship, and the one or more uplink reference signals are transmitted on the uplink reference signal ports capable of being used for the coherent transmission through the antennas capable of being used for the coherent transmission.

11. An uplink transmission configuration method, performed by a base station, comprising:
receiving coherent transmission capability information about UE from the UE;
configuring configuration information about one or more uplink reference signal resources for the UE;
receiving one or more uplink reference signals transmitted by the UE based on the configuration information configured by the base station; and
transmitting indication information about the uplink transmission determined by the base station to the UE;
wherein the indication information about the uplink transmission comprises a Transmission Precoding Matrix Indicator (TPMI) and a Transmission Rank Indicator (TRI) the TPMI and the TRI are encoded jointly, and a quantity of active encoding states of the TPMI and the TRI which are encoded jointly is equal to a sum of quantities of the precoding matrices for a coherent transmission relationship among the uplink reference signal ports corresponding to all possible values of the TRI; or a total quantity of active encoding states is a sum of quantities of all possible precoding matrices corresponding to all TRIs.

12. The uplink transmission configuration method according to claim 11, wherein the configuring the configuration information about the one or more uplink reference signal resources for the UE comprises:
determining the configuration information about the one or more uplink reference signal resources based on the coherent transmission capability information reported by the UE.

13. The uplink transmission configuration method according to claim 11, wherein prior to receiving the one or more uplink reference signals transmitted by the UE based on the configuration information configured by the base station, the uplink transmission configuration method further comprises:
transmitting information about the coherent transmission relationship among the uplink reference signal ports in the one or more uplink reference signal resources to the UE.

14. The uplink transmission configuration method according to claim 13, wherein the information about the coherent transmission relationship is determined based on the coherent transmission capability information.

15. The uplink transmission configuration method according to claim 11, wherein the coherent transmission capability information about the UE comprises antenna group information, antennas in each antenna group are capable of being used for coherent transmission, and antennas in different antenna groups are incapable of being used for coherent transmission.

16. The uplink transmission configuration method according to claim 13, wherein the information about the coherent transmission relationship comprises uplink reference signal port group information, uplink reference signal ports in each uplink reference signal port group are capable of being used for the coherent transmission, and uplink reference signal ports in different uplink reference signal port groups are incapable of being used for the coherent transmission.

17. The uplink transmission configuration method according to claim 13, wherein the information about the coherent transmission relationship comprises information indicating that at least parts of the uplink reference signal ports in a same uplink reference signal resource are capable of being used for the coherent transmission or information indicating that all the uplink reference signal ports in the same uplink reference signal resource are incapable of being used for the coherent transmission.

18. The uplink transmission configuration method according to claim 11, wherein the configuring the configuration information about the one or more uplink reference signal resources for the UE comprises:
directly transmitting the configuration information about the one or more uplink reference signal resources to the UE,
wherein prior to receiving the one or more uplink reference signals transmitted by the UE based on the configuration information configured by the base station, the uplink transmission configuration method further comprises:
receiving the information about the coherent transmission relationship among the uplink reference signal ports from the UE.

19. A UE, comprising a transceiver, a memory, a processor, and a computer program stored in the memory and executed by the processor, wherein the processor is configured to execute the computer program so as to implement the uplink transmission method according to claim 1.

20. A base station, comprising a transceiver, a memory, a processor, and a computer program stored in the memory and executed by the processor, wherein the processor is configured to execute the computer program so as to implement the uplink transmission configuration method according to claim 11.

* * * * *